United States Patent
Kodama

(10) Patent No.: US 9,215,495 B2
(45) Date of Patent: Dec. 15, 2015

(54) AUTHENTICATION OF DISTRIBUTED MOTION IMAGE DATA USING DATA STRUCTURES

(75) Inventor: Mei Kodama, Hiroshima (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 229 days.

(21) Appl. No.: 13/153,002

(22) Filed: Jun. 3, 2011

(65) Prior Publication Data

US 2011/0239261 A1    Sep. 29, 2011

Related U.S. Application Data

(63) Continuation of application No. 12/276,855, filed on Nov. 24, 2008, now Pat. No. 8,005,150.

(30) Foreign Application Priority Data

May 27, 2008   (JP) .................................. 2008-138025

(51) Int. Cl.
| | |
|---|---|
| *H04N 21/435* | (2011.01) |
| *H04N 21/44* | (2011.01) |
| *H04N 21/235* | (2011.01) |
| *H04N 19/89* | (2014.01) |

(Continued)

(52) U.S. Cl.
CPC ............. *H04N 21/435* (2013.01); *H04N 19/65* (2014.11); *H04N 19/89* (2014.11); *H04N 21/235* (2013.01); *H04N 21/44008* (2013.01); *H04N 19/166* (2014.11)

(58) Field of Classification Search
CPC ............ H04N 21/235; H04N 21/2353; H04N 21/435; H04N 21/4355
See application file for complete search history.

(56) References Cited

U.S. PATENT DOCUMENTS

| 6,466,624 B1 | 10/2002 | Fogg |
| 6,483,945 B1* | 11/2002 | Kato ............................. 382/236 |
| 6,621,868 B1 | 9/2003 | Kimata et al. |

(Continued)

FOREIGN PATENT DOCUMENTS

| JP | 2002-014681 | 1/2002 |
| JP | 2002-074832 | 3/2002 |

(Continued)

OTHER PUBLICATIONS

ITU-T Recommendation H.262 (Feb. 2000).*

(Continued)

*Primary Examiner* — Dave Czekaj
*Assistant Examiner* — David N Werner
(74) *Attorney, Agent, or Firm* — Foley & Lardner LLP

(57) ABSTRACT

A motion image distribution system includes a server and a user terminal. The server generates a feature quantity table CHT1 representing a data structure of motion image encoded data VDE, and authenticates the motion image encoded data VDE by using the generated feature quantity table CHT1. Then, the server transmits the motion image encoded data VDE and the feature quantity table CHT1 to the user terminal. The user terminal generates a feature quantity table CHT2 representing a data structure of the received motion image encoded data VDE, and authenticates received motion image encoded data VDE by using the generated feature quantity table CHT2. Then, the user terminal plays back the motion image encoded data VDE and outputs motion image playback information.

20 Claims, 17 Drawing Sheets

(51) Int. Cl.
*H04N 19/65* (2014.01)
*H04N 19/166* (2014.01)

(56) References Cited

U.S. PATENT DOCUMENTS

| | | | |
|---|---|---|---|
| 8,005,150 B2* | 8/2011 | Kodama | 375/240.27 |
| 2002/0004838 A1* | 1/2002 | Hakenberg et al. | 709/231 |
| 2002/0159523 A1* | 10/2002 | Wang et al. | 375/240.05 |
| 2008/0288410 A1 | 11/2008 | Nino | |
| 2009/0006950 A1 | 1/2009 | Gross et al. | |
| 2009/0016447 A1 | 1/2009 | Chen et al. | |
| 2009/0028192 A1* | 1/2009 | Rieger et al. | 370/535 |
| 2009/0245392 A1 | 10/2009 | Leung et al. | |

FOREIGN PATENT DOCUMENTS

| | | |
|---|---|---|
| JP | 2003-208185 | 7/2003 |
| JP | 2004-088279 | 3/2004 |
| JP | 2004-135081 | 4/2004 |
| JP | 2005-236409 | 8/2005 |
| JP | 2005-323215 | 11/2005 |
| JP | 2006-127416 | 5/2006 |
| JP | 2006-324990 | 11/2006 |
| JP | 2007-207190 | 8/2007 |
| JP | 2008-011406 | 1/2008 |
| WO | WO 2005/029765 | 3/2005 |
| WO | WO-2005/101837 | 10/2005 |

OTHER PUBLICATIONS

B. Girod & N. Farber, "Feedback-Based Error Control for Mobile Video Transmission", 87 Proc. of IEEE 1707 (Oct. 1999).

C.Y. Lin & S.F. Chang, "Issues and Solutions for Authenticating MPEG Video", IEEE 1999 Int'l Conf. on Acoustics, Speech and Signal Processing 54 (Apr. 1999).

B. Yan & K.W. Ng, "Analysis and Detection of MPEG-4 Visual Transmission Errors over Error-Prone Channels", 49 IEEE Transactions on Consumer Electronics 1424 (Nov. 2003).

P. Yin, M. Wu and B. Liu, "A Robust Error Resilient Approach for MPEG Video Transmission over Internet", Proc. of 2000 Int'l Symposium on Multimedia Software Engineering 17 (Dec. 2000).

Office Action for Japanese Patent Application No. 2008-138025 mailed Jun. 30, 2009 (with English translation).

Office Action for Japanese Patent Application No. 2008-138025 dispatched Nov. 17, 2009. (English Translation included).

US Notice of Allowance on U.S. Appl. No. 12/276,855 DTD May 9, 2011.

US Office Action on U.S. Appl. No. 12/276,855 DTD Feb. 2, 2011.

* cited by examiner

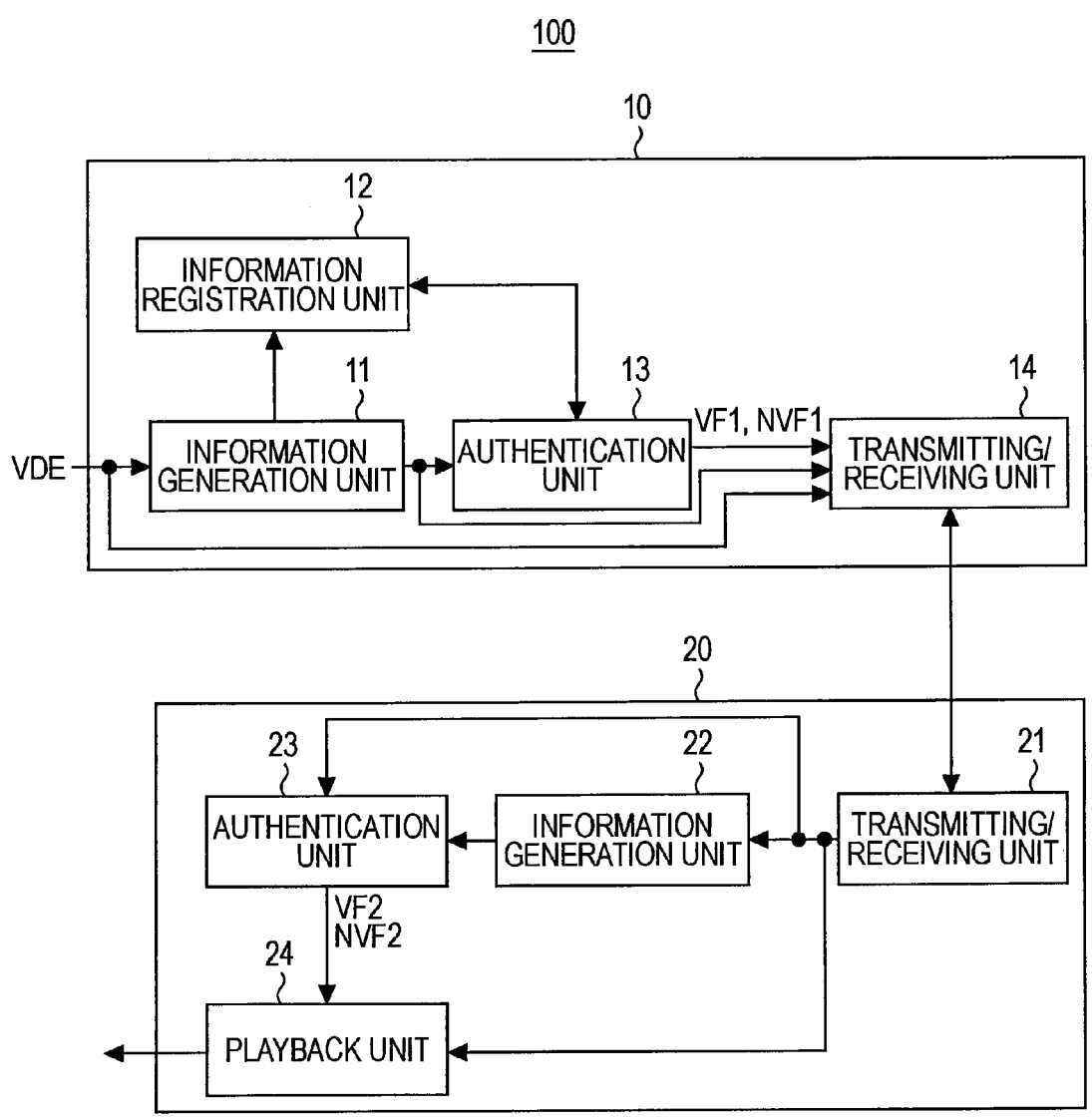

FIG. 4

CHT

| PLAYBACK TIME | ENCODING STRUCTURE INFORMATION | ENCODING MODE | BIT RATE | ACTUAL DATA |
|---|---|---|---|---|
| | | | | |

FIG. 5

CHT-A

| PLAYBACK TIME | ENCODING STRUCTURE INFORMATION | ENCODING MODE | BIT RATE |
|---|---|---|---|
| $T_1$ | SEQUENCE | | SEQUENCE SIZE |
| $T_2$ | $GOP_1$ Picture$_1$···Picture$_P$ Slice$_1$···Slice$_Y$ MB$_1$···MB$_X$ | $M_1 M_1 M_2 ··· M_2 M_3$ | $GOP_1$ SIZE Picture$_1$···$_P$ SIZE Slice$_1$···$_Y$ SIZE MB$_1$···$_X$ SIZE |
| $T_N$ | $GOP_2$ Picture$_1$···Picture$_P$ Slice$_1$···Slice$_Y$ MB$_1$···MB$_X$ | $M_3 M_4 M_3 ··· M_N M_2$ | $GOP_2$ SIZE Picture$_1$···$_P$ SIZE Slice$_1$···$_Y$ SIZE MB$_1$···$_X$ SIZE |
| $T_T$ | $GOP_G$ Picture$_1$···Picture$_P$ Slice$_1$···Slice$_Y$ MB$_1$···MB$_X$ | $M_3 M_4 M_3 ··· M_2 M_1$ | $GOP_G$ SIZE Picture$_1$···$_P$ SIZE Slice$_1$···$_Y$ SIZE MB$_1$···$_X$ SIZE |

FIG. 6

| PLAYBACK TIME | ENCODING STRUCTURE INFORMATION | ENCODING MODE | BIT RATE | ACTUAL DATA |
|---|---|---|---|---|
| $T_1$ | SEQUENCE $GOP_1$ $Picture_1 \cdots Picture_P$ $Slice_1 \cdots Slice_Y$ $MB_1 \cdots MB_X$ | | SEQUENCE SIZE $GOP_1$ SIZE $Picture_1 \cdots_P$ SIZE $Slice_1 \cdots_Y$ SIZE $MB_1 \cdots_X$ SIZE | |
| $T_2$ | | $M_1M_1M_2 \cdots M_2M_3$ | | $MV_1$ |
| $\vdots$ | $GOP_2$ $Picture_1 \cdots Picture_P$ $Slice_1 \cdots Slice_Y$ $MB_1 \cdots MB_X$ | $M_3M_4M_3 \cdots M_NM_2$ | $GOP_2$ SIZE $Picture_1 \cdots_P$ SIZE $Slice_1 \cdots_Y$ SIZE $MB_1 \cdots_X$ SIZE | $MV_2$ |
| $T_N$ | | | | |
| $\vdots$ | $\cdots$ | $\cdots$ | $\cdots$ | $\cdots$ |
| $T_T$ | $GOP_G$ $Picture_1 \cdots Picture_P$ $Slice_1 \cdots Slice_Y$ $MB_1 \cdots MB_X$ | $M_3M_4M_3 \cdots M_2M_1$ | $GOP_G$ SIZE $Picture_1 \cdots_P$ SIZE $Slice_1 \cdots_Y$ SIZE $MB_1 \cdots_X$ SIZE | $MV_G$ |

CHT-B

FIG. 7

CHT-C

| PLAYBACK TIME | ENCODING STRUCTURE INFORMATION | ENCODING MODE | BIT RATE |
|---|---|---|---|
| $T_1$ | SEQUENCE $GOP_1$ L-Picture$_1$···L-Picture$_P$ Slice$_1$···Slice$_Y$ $MB_1$···$MB_X$ H-Picture$_1$···H-Picture$_P$ Slice$_1$···Slice$_Y$ $MB_1$···$MB_X$ | | SEQUENCE SIZE $GOP_1$ SIZE L-Picture$_1$···$_P$ SIZE Slice$_1$···$_Y$ SIZE $MB_1$···$_X$ SIZE H-Picture$_1$···$_P$ SIZE Slice$_1$···$_Y$ SIZE $MB_1$···$_X$ SIZE |
| $T_2$ | | $M_3M_4M_3$···$M_2M_2$ | |
| | | $M_1M_1M_2$···$M_2M_3$ | |
| ··· $T_N$ ··· | ··· | ··· | ··· |
| | $GOP_G$ L-Picture$_1$···L-Picture$_P$ Slice$_1$···Slice$_Y$ $MB_1$···$MB_X$ H-Picture$_1$···H-Picture$_P$ Slice$_1$···Slice$_Y$ $MB_1$···$MB_X$ | $M_3M_4M_3$···$M_2M_1$ | $GOP_G$ SIZE L-Picture$_1$···$_P$ SIZE Slice$_1$···$_Y$ SIZE $MB_1$···$_X$ SIZE H-Picture$_1$···$_P$ SIZE Slice$_1$···$_Y$ SIZE $MB_1$···$_X$ SIZE |
| $T_T$ | | $M_3M_4M_3$···$M_NM_2$ | |

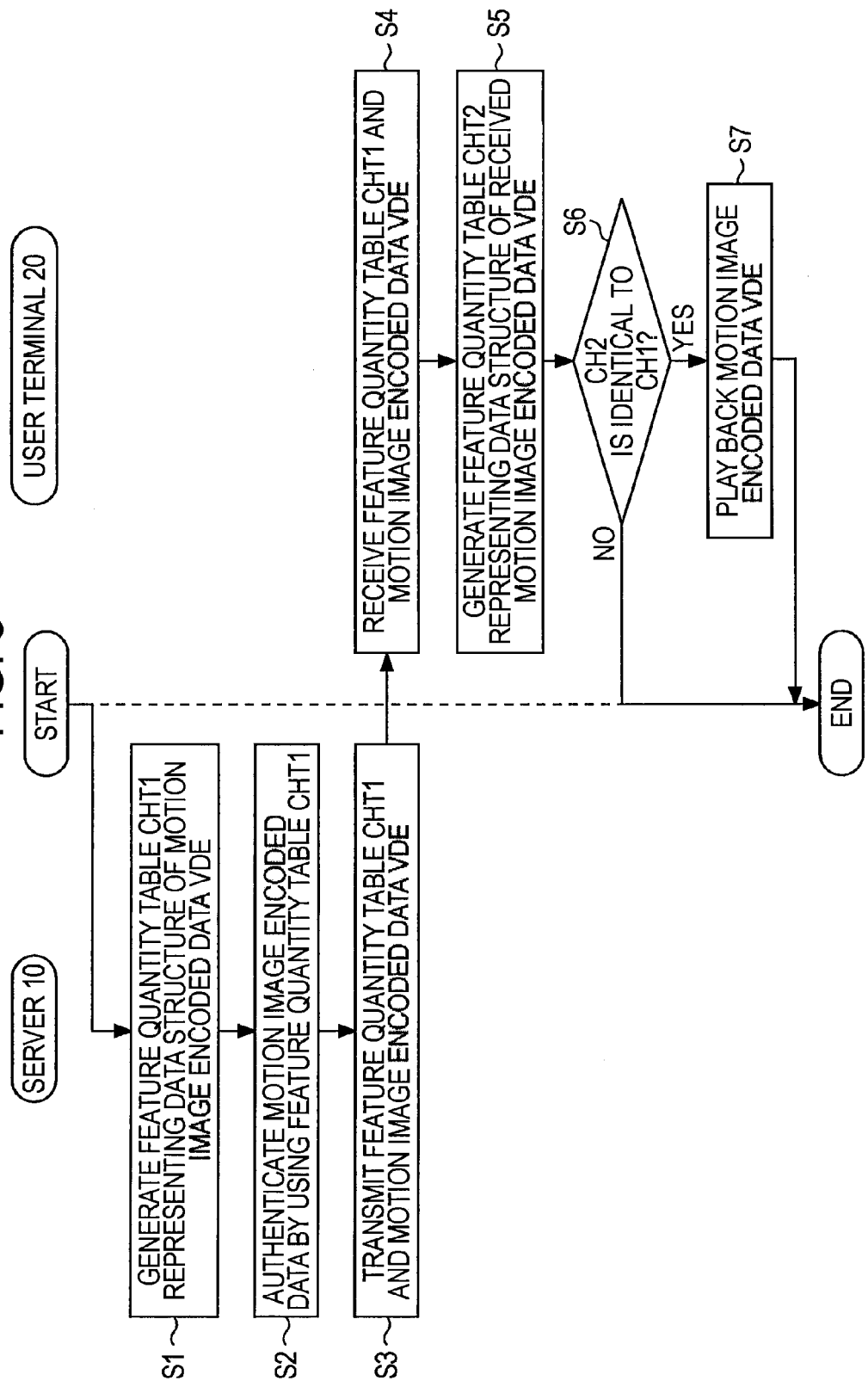

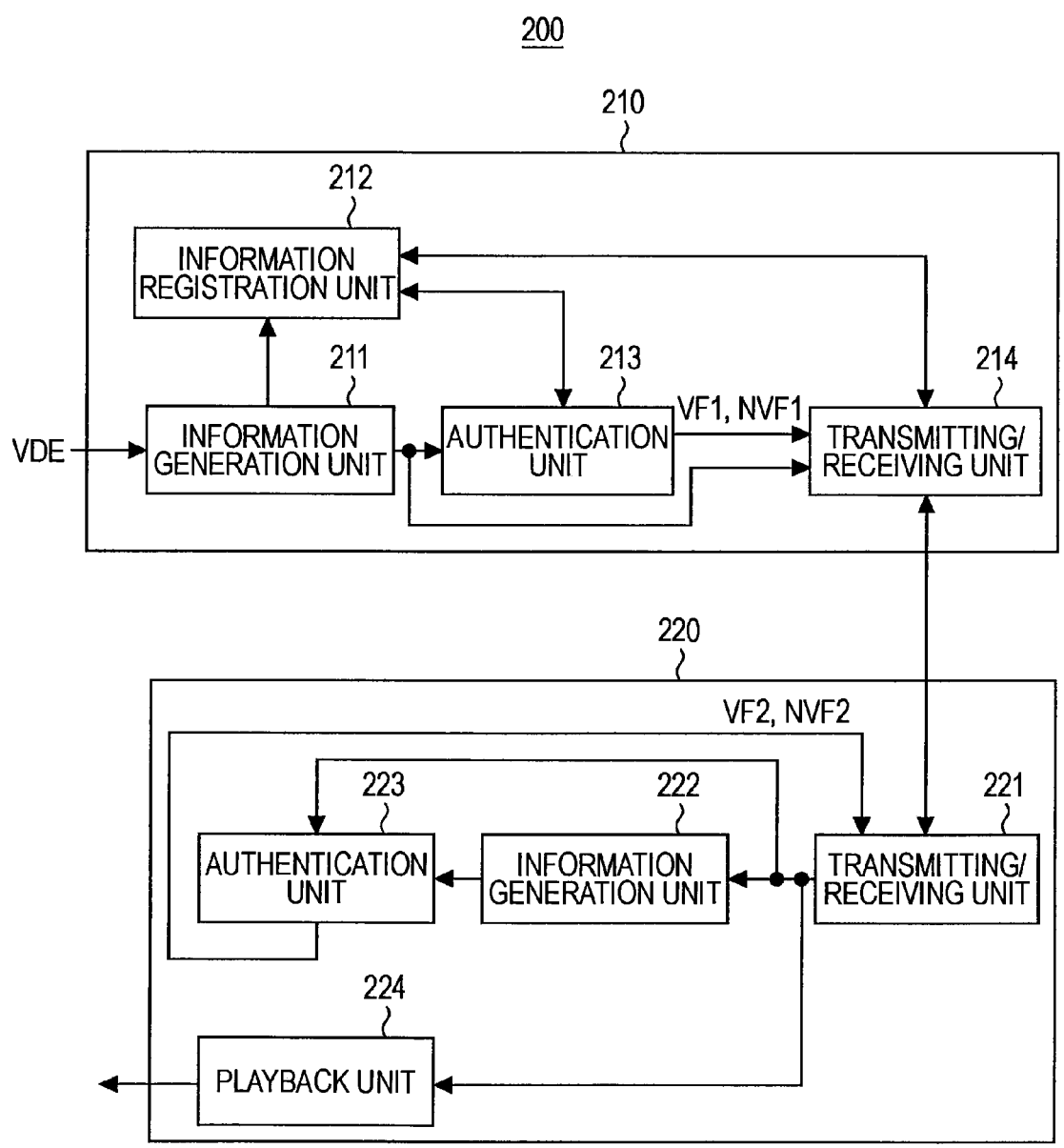

FIG. 12

CHTT

| PLAYBACK TIME | ENCODING STRUCTURE INFORMATION | REARRANGEMENT ENCODING MODE | BIT RATE | ACTUAL DATA |
|---|---|---|---|---|
| | | | | |

FIG. 13

CHTT-A

| PLAYBACK TIME | ENCODING STRUCTURE INFORMATION | REARRANGEMENT ENCODING MODE | BIT RATE |
|---|---|---|---|
| $T_1$ $T_2$ $\vdots$ $T_N$ $\vdots$ $T_T$ | SEQUENCE<br>$GOP_1$<br>$Picture_1 \cdots Picture_P$<br>$Slice_1 \cdots Slice_Y$<br>$MB_1 \cdots MB_X$<br><br>$GOP_2$<br>$Picture_1 \cdots Picture_P$<br>$Slice_1 \cdots Slice_Y$<br>$MB_1 \cdots MB_X$<br>$\vdots$<br>$GOP_G$<br>$Picture_1 \cdots Picture_P$<br>$Slice_1 \cdots Slice_Y$<br>$MB_1 \cdots MB_X$ | $M_3M_4M_3 \cdots M_NM_2$<br><br><br>$M_1M_1M_2 \cdots M_2M_3$<br>$\vdots$<br><br>$M_3M_2M_1 \cdots M_5M_2$ | SEQUENCE SIZE<br>$GOP_1$ SIZE<br>$Picture_{1 \cdots P}$ SIZE<br>$Slice_{1 \cdots Y}$ SIZE<br>$MB_{1 \cdots X}$ SIZE<br><br>$GOP_2$ SIZE<br>$Picture_{1 \cdots P}$ SIZE<br>$Slice_{1 \cdots Y}$ SIZE<br>$MB_{1 \cdots X}$ SIZE<br>$\vdots$<br>$GOP_G$ SIZE<br>$Picture_{1 \cdots P}$ SIZE<br>$Slice_{1 \cdots Y}$ SIZE<br>$MB_{1 \cdots X}$ SIZE |

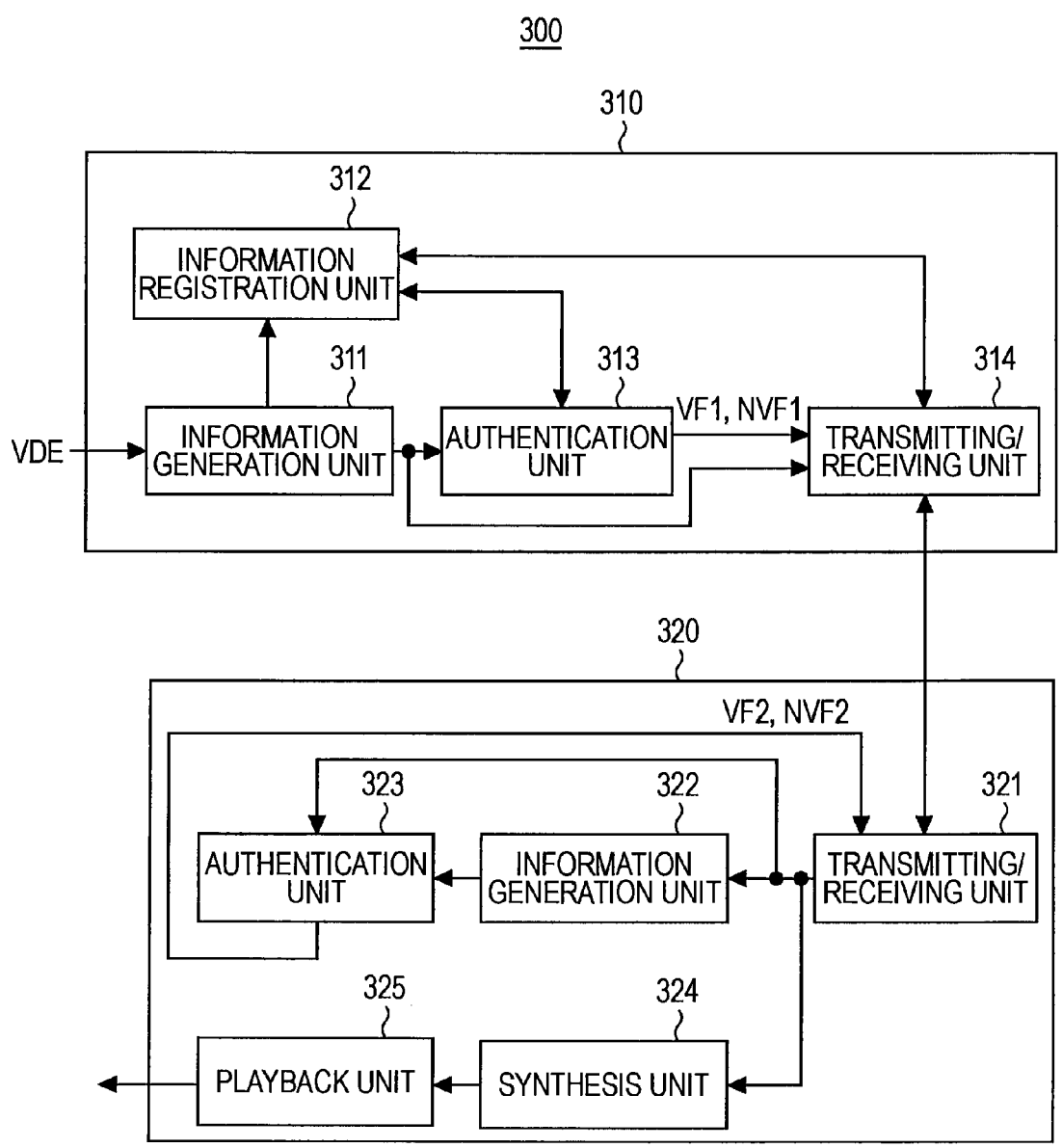

FIG. 18

CHT-CTD-A

| PLAYBACK TIME | ENCODING STRUCTURE INFORMATION | ENCODING MODE | BIT RATE |
|---|---|---|---|
| $T_1$ | SEQUENCE | | SEQUENCE SIZE |
| | $GOP_1$ | | $GOP_1$ SIZE |
| $T_2$ | $Picture_1 \cdots Picture_P$ | | $Picture_{1 \cdots P}$ SIZE |
| . | $Slice_1 \cdots Slice_Y$ | | $Slice_{1 \cdots Y}$ SIZE |
| . | $MB_1 \cdots MB_X$ | $M_1 M_1 \cdots M_2 M_3$ | $MB_{1 \cdots X}$ SIZE |
| . | | | |
| | $GOP_2$ | | $GOP_2$ SIZE |
| | $Picture_1 \cdots Picture_P$ | | $Picture_{1 \cdots P}$ SIZE |
| $T_N$ | $Slice_1 \cdots Slice_Y$ | | $Slice_{1 \cdots Y}$ SIZE |
| | $MB_1 \cdots MB_X$ | $M_3 M_4 M_3 \cdots M_1 \cdots M_N M_2$ | $MB_{1 \cdots X}$ SIZE |
| . | . | . | . |
| . | . | . | . |
| . | . | . | . |
| | $GOP_G$ | | $GOP_G$ SIZE |
| $T_T$ | $Picture_1 \cdots Picture_P$ | | $Picture_{1 \cdots P}$ SIZE |
| | $Slice_1 \cdots Slice_Y$ | | $Slice_{1 \cdots Y}$ SIZE |
| | $MB_1 \cdots MB_X$ | $M_3 M_4 M_3 \cdots M_2 M_1$ | $MB_{1 \cdots X}$ SIZE |

FIG. 19

CHT-A

| PLAYBACK TIME | ENCODING STRUCTURE INFORMATION | ENCODING MODE | BIT RATE |
|---|---|---|---|
| $T_1$ | SEQUENCE | | SEQUENCE SIZE |
| | $GOP_1$ | | $GOP_1$ SIZE |
| $T_2$ | $Picture_1 \cdots Picture_P$ | | $Picture_{1 \cdots P}$ SIZE |
| . | $Slice_1 \cdots Slice_Y$ | | $Slice_{1 \cdots Y}$ SIZE |
| . | $MB_1 \cdots MB_X$ | $M_1 M_1 \cdots M_2 M_4 M_3 \cdots M_2 M_3$ | $MB_{1 \cdots X}$ SIZE |
| . | | | |
| | $GOP_2$ | | $GOP_2$ SIZE |
| | $Picture_1 \cdots Picture_P$ | | $Picture_{1 \cdots P}$ SIZE |
| $T_N$ | $Slice_1 \cdots Slice_Y$ | | $Slice_{1 \cdots Y}$ SIZE |
| | $MB_1 \cdots MB_X$ | $M_3 M_4 M_3 \cdots M_2 M_1 M_3 \cdots M_N M_2$ | $MB_{1 \cdots X}$ SIZE |
| . | . | . | . |
| . | . | . | . |
| . | . | . | . |
| | $GOP_G$ | | $GOP_G$ SIZE |
| $T_T$ | $Picture_1 \cdots Picture_P$ | | $Picture_{1 \cdots P}$ SIZE |
| | $Slice_1 \cdots Slice_Y$ | | $Slice_{1 \cdots Y}$ SIZE |
| | $MB_1 \cdots MB_X$ | $M_3 M_4 M_3 \cdots M_1 M_2 \cdots M_2 M_1$ | $MB_{1 \cdots X}$ SIZE |

FIG. 20

CHT-LKD-A

| PLAYBACK TIME | ENCODING STRUCTURE INFORMATION | ENCODING MODE | BIT RATE |
|---|---|---|---|
| $T_1$ | SEQUENCE | | SEQUENCE SIZE |
| | $GOP_1$ | | $GOP_1$ SIZE |
| $T_2$ | $Picture_1 \cdots Picture_P$ | | $Picture_{1 \cdots P}$ SIZE |
| ⋮ | $Slice_1 \cdots Slice_Y$ | | $Slice_{1 \cdots Y}$ SIZE |
| | $MB_1 \cdots MB_X$ | $M_2 M_4 M_3$ | $MB_{1 \cdots X}$ SIZE |
| | $GOP_2$ | | $GOP_2$ SIZE |
| | $Picture_1 \cdots Picture_P$ | | $Picture_{1 \cdots P}$ SIZE |
| $T_N$ | $Slice_1 \cdots Slice_Y$ | | $Slice_{1 \cdots Y}$ SIZE |
| ⋮ | $MB_1 \cdots MB_X$ | $M_2 M_3$ | $MB_{1 \cdots X}$ SIZE |
| | ⋮ | ⋮ | ⋮ |
| | $GOP_G$ | | $GOP_G$ SIZE |
| $T_T$ | $Picture_1 \cdots Picture_P$ | | $Picture_{1 \cdots P}$ SIZE |
| | $Slice_1 \cdots Slice_Y$ | | $Slice_{1 \cdots Y}$ SIZE |
| | $MB_1 \cdots MB_X$ | $M_1 M_2$ | $MB_{1 \cdots X}$ SIZE |

FIG. 21

SEPA-A

| | SEPARATION DATA |
|---|---|
| SEQUENCE ← | 0 |
| $GOP_1$ ← | 0 |
| $Picture_1 \cdots Picture_P$ ← | 0 |
| $Slice_1 \cdots Slice_Y$ ← | 0000⋯1⋯00 |
| $MB_1 \cdots MB_X$ ← | 00⋯111⋯00 |
| $GOP_2$ ← | 0 |
| $Picture_1 \cdots Picture_P$ ← | 0 |
| $Slice_1 \cdots Slice_Y$ ← | 0000⋯0⋯00 |
| $MB_1 \cdots MB_X$ ← | 000⋯101⋯00 |
| ⋮ | ⋮ |
| $GOP_G$ ← | 0 |
| $Picture_1 \cdots Picture_P$ ← | 0 |
| $Slice_1 \cdots Slice_Y$ ← | 0010⋯0⋯00 |
| $MB_1 \cdots MB_X$ ← | 000⋯11⋯00000 |

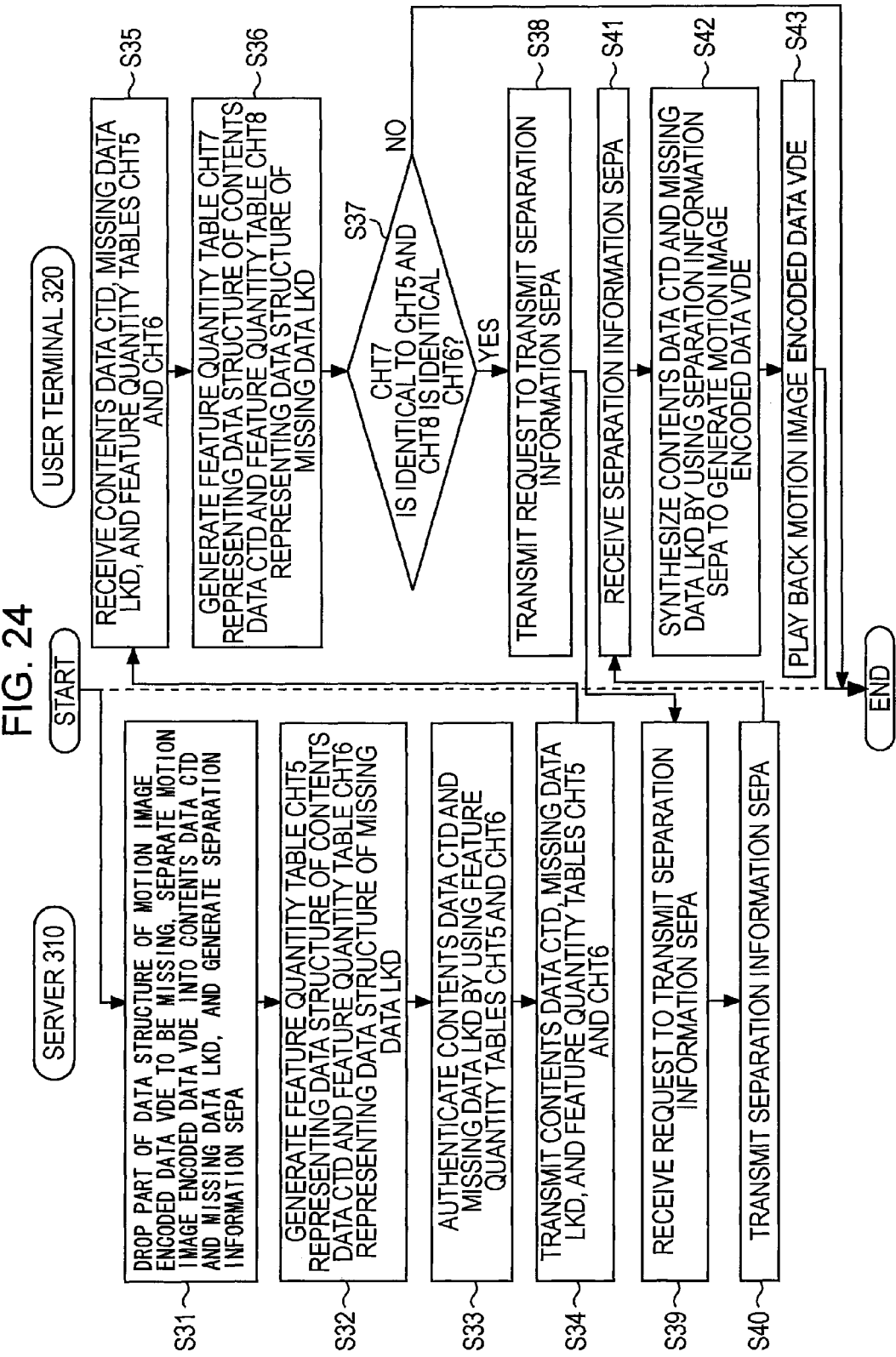

AUTHENTICATION OF DISTRIBUTED MOTION IMAGE DATA USING DATA STRUCTURES

CROSS-REFERENCE TO RELATED APPLICATION

This application is a continuation under 35 U.S.C. §120 of and claims priority from U.S. application Ser. No. 12/276,855, filed on Nov. 24, 2008, now U.S. Pat. No. 8,005,150, which claims priority from Japanese Patent Application No. 2008-138025 filed May 27, 2008 Each of the above-referenced applications is incorporated herein by reference in their entireties.

BACKGROUND

1. Field

The present disclosure relates to a motion image distribution system, a motion image distribution method, a server for a motion image distribution system, and a user terminal for a motion image distribution system. In particular, the present disclosure relates to a motion image distribution system, a motion image distribution method, a server for a motion image distribution system, and a user terminal for a motion image distribution system, which promote regular distribution of image data.

2. Description of the Related Art

An authentication technology is known that authenticates communication data (JP-A-2005-323215). In the authentication technology, data includes a header area, a header authentication data area, a data area, and an authentication data area.

The header authentication data area is used to authenticate validity of the header area. The authentication data area is used to authenticate validity of the header authentication data area and validity of the data area.

As such, in the known authentication technology, data subject to authentication includes authentication data, in addition to original data.

However, like the related art, if an authentication data area is provided in the data structure, the amount of data to be transmitted is increased, and a transmission speed may be lowered.

SUMMARY

A representative embodiment provides a motion image distribution system that can authenticate data with no authentication data area.

Another representative embodiment provides a motion image distribution method that can authenticate data with no authentication data area.

Yet another representative embodiment provides a server for a motion image distribution system that can authenticate data with no authentication data area.

Yet another representative embodiment provides a user terminal for a motion image distribution system that can authenticate data with no authentication data area.

According to a first aspect, a motion image distribution system includes a server and a user terminal. Upon receiving motion image encoded data obtained by encoding motion image data, the server generates first structure information representing a data structure of the motion image encoded data on the basis of received motion image encoded data, and upon authenticating the motion image encoded data as regular data by using the generated first structure information, transmits the first structure information and the motion image encoded data. The user terminal receives the first structure information and the motion image encoded data from the server, generates second structure information representing the data structure of the motion image encoded data on the basis of received motion image encoded data, when the generated second structure information is identical to the received first structure information, authenticates the motion image encoded data as regular data, and plays back the motion image encoded data.

The server may hold a database including a collection of structure information representing various kinds of motion image encoded data as regular data, when the generated first structure information is identical to one of a plurality of structure information stored in the database, authenticate received motion image encoded data as regular data, and transmit the first structure information and the motion image encoded data to the user terminal.

The server may store first encoding information, in which a plurality of encoding type information representing an encoding type of the motion image encoded data are arranged in a regular array, and second encoding information, in which the plurality of encoding type information are rearranged, in association with each other, upon receiving the motion image encoded data, generate rearranged motion image encoded data by rearranging the plurality of encoding type information of received motion image encoded data, generate third structure information representing a data structure of generated rearranged motion image encoded data, upon authenticating the motion image encoded data as regular data by using the third structure information, transmit the third structure information and the rearranged motion image encoded data to the user terminal, and transmit the first encoding information to the user terminal in response to a request to transmit the first encoding information from the user terminal. The user terminal may receive the third structure information and the rearranged motion image encoded data from the server, generate fourth structure information representing the data structure of the rearranged motion image encoded data on the basis of received rearranged motion image encoded data, when the generated fourth structure information is identical to the received third structure information, authenticate the motion image encoded data as regular data, transmit the request to transmit the first encoding information to the server, upon receiving the first encoding information from the server, rearrange the plurality of encoding type information of the rearranged motion image encoded data in a regular array by using the received first encoding information to generate the motion image encoded data, and play back generated motion image encoded data.

Upon receiving the motion image encoded data, the server may separate received motion image encoded data into missing data including data necessary for playback of the motion image encoded data and contents data other than missing data, generate third structure information representing a data structure of separated missing data, fourth structure information representing a data structure of contents data, and missing information representing a missing portion of the motion image encoded data, upon authenticating the motion image encoded data as regular data by using the third and fourth structure information, transmit the third structure information, the fourth structure information, the missing data, and the contents data to the user terminal, and transmit the missing information to the user terminal in response to a request to transmit the missing information from the user terminal. The user terminal may receive the third structure information, the fourth structure information, the missing data, and the contents data from the server, generate fifth structure information representing the data structure of received missing data and sixth structure information representing the data structure of received contents data, when the fifth and sixth structure information are identical to the third and fourth structure information, respectively, authenticate the motion image encoded data as regular data, transmit the request to transmit the missing information to the server, upon receiving the missing information from the server, synthesize the received missing data and the contents data by using the received missing information to generate the motion image encoded data, and play back generated motion image encoded data.

The missing data may include a plurality of encoding type information representing an encoding type of the motion image encoded data.

The missing data may include some of the plurality of encoding type information.

The missing data may include encoding type information of the motion image encoded data representing a center position of a screen or a motion area when the motion image encoded data is played back.

According to a second aspect, a motion image distribution method comprising: a first step causing a server to generate first structure information representing a data structure of motion image encoded data obtained by encoding motion image data; a second step causing the server to transmit the first structure information and motion image encoded data when the server authenticates the motion image encoded data as regular data by using the first structure information; a third step causing a user terminal to receive the first structure information and the motion image encoded data from the server; a fourth step causing the user terminal to generate second structure information representing the data structure of the motion image encoded data on the basis received motion image encoded data; and a fifth step causing the user terminal to authenticate the motion image encoded data as regular data and to play back the motion image encoded data when the generated second structure information is identical to the received first structure information.

The server may store first encoding information, in which a plurality of encoding type information representing an encoding type of the motion image encoded data are arranged in a regular array, and second encoding information, in which the plurality of encoding type information are rearranged, in association with each other. In the first step of the motion image distribution method, the server may generate rearranged motion image encoded data by rearranging the plurality of encoding type information of the motion image encoded data, and generate third structure information representing a data structure of generated rearranged motion image encoded data. In the second step, when the server authenticates the motion image encoded data as regular data by using the third structure information, the server may transmit the third structure information and the rearranged motion image encoded data to the user terminal. In the third step, the user terminal may receive the third structure information and the rearranged motion image encoded data from the server. In the fourth step, the user terminal may generate fourth structure information representing a data structure of the rearranged motion image encoded data on the basis of received rearranged motion image encoded data. In the fifth step, when the generated fourth structure information is identical to the received third structure information, the user terminal may authenticate the motion image encoded data as regular data, rearrange the plurality of encoding type information of the rearranged motion image encoded data in a regular array by using the first encoding information to generate the motion image encoded data, and play back generated motion image encoded data.

The motion image distribution method may further include a sixth step causing the user terminal to transmit a request to transmit the first encoding information to the server when the generated fourth structure information is identical to the received third structure information; a seventh step causing the server to transmit the first encoding information to the user terminal in response to a request to transmit the first encoding information from the user terminal; and an eighth step causing the user terminal to receive the first encoding information from the server.

In the first step, the server may separate the motion image encoded data into missing data including data necessary for playback of the motion image encoded data and contents data other than missing data, and generate third structure information representing a data structure of separated missing data, fourth structure information representing a data structure of the contents data, and missing information representing a missing portion of the motion image encoded data. In the second step, when the server authenticates the motion image encoded data as regular data by using the third and fourth structure information, the server may transmit the third structure information, the fourth structure information, the missing data, and the contents data to the user terminal. In the third step, the user terminal may receive the third structure information, the fourth structure information, the missing data, and the contents data from the server. In the fourth step, the user terminal may generate fifth structure information representing a data structure of the received missing data and sixth structure information representing a data structure of the received contents data. In the fifth step, when the generated fifth and sixth structure information are identical to the received third and fourth structure information, respectively, the user terminal may authenticate the motion image encoded data as regular data, synthesize received missing data and the contents data by using the missing information to generate the motion image encoded data, and play back generated motion image encoded data.

The motion image distribution method may further include: a sixth step causing the user terminal to transmit a request to transmit the missing information to the server when the generated fifth and sixth structure information are identical to the received third and fourth structure information, respectively; a seventh step causing the server to transmit the missing information to the user terminal in response to the request to transmit the missing information from the user terminal; and an eighth step causing the user terminal to receive the missing information from the server.

According to a third aspect, a server includes an information generation unit, and authentication unit, and a transmitting unit. Upon receiving motion image encoded data obtained by encoding motion image data, the information generation unit generates structure information representing a data structure of the motion image encoded data on the basis of received motion image encoded data. The authentication unit authenticates the motion image encoded data as regular data by using the structure information. When the authentication unit authenticates the motion image encoded data as regular data, the transmitting unit transmits the structure information and the motion image encoded data to a user terminal.

According to a fourth aspect, a user terminal includes a receiving unit, an information generation unit, an authentication unit, and a playback unit. The receiving unit receives first structure information representing a data structure of motion image encoded data obtained by encoding motion image data and the motion image encoded data from a server. The information generation unit generates second structure information representing the data structure of the motion image encoded data on the basis of motion image encoded data received by the receiving unit. When the generated second structure information is identical to the received first structure information, the authentication unit authenticates motion image encoded data as regular data. Upon authenticating the motion image encoded data as regular data, the playback unit plays back the motion image encoded data.

According to aspects of a representative embodiment, upon authenticating the motion image encoded data by using the first structure information representing the data structure of the motion image encoded data, the server transmits the first structure information and the motion image encoded data to the user terminal. The user terminal receives the first structure information and the motion image encoded data from the server, generates second structure information representing the data structure of received motion image encoded data, when the generated second structure information is identical to the first structure information, authenticates the motion image encoded data as regular data. Then, upon authenticating the motion image encoded data as regular data, the user terminal plays back the motion image encoded data.

Therefore, according to aspects of a representative embodiment, the motion image encoded data can be authenticated on the basis of the data structure of the motion image encoded data, in which no authentication data area is provided. As a result, it is possible to suppress lowering of a transmission speed of the motion image encoded data.

In addition, only a user terminal having the above-described authentication mechanism can receive the motion image encoded data from the server and play back received motion image encoded data. Meanwhile, a user terminal having no authentication mechanism can receive the motion image encoded data, but cannot play back received the motion image encoded data.

As a result, illegal distribution of the motion image encoded data can be suppressed.

BRIEF DESCRIPTION OF THE DRAWINGS

FIG. 3 is a schematic block diagram of a motion image distribution system according to a first embodiment;

FIG. 4 is a conceptual view of a feature quantity table in the first embodiment;

FIG. 5 is a diagram showing a specific example of the feature quantity table shown in FIG. 4;

FIG. 6 is a diagram showing another specific example of the feature quantity table shown in FIG. 4;

FIG. 7 is a diagram showing yet another specific example of the feature quantity table shown in FIG. 4;

FIG. 8 is a flowchart illustrating the operation of the motion image distribution system shown in FIG. 3;

FIG. 9 is a schematic block diagram of a motion image distribution system according to a second embodiment;

FIG. 12 is a conceptual view of a feature quantity table in the second embodiment;

FIG. 13 is a diagram showing a specific example of the feature quantity table in the second embodiment;

FIG. 17 is a schematic block diagram of a motion image distribution system according to a third embodiment;

FIG. 18 is a diagram showing a specific example of a feature quantity table of contents data;

FIG. 19 is a diagram showing a specific example of a feature quantity table of motion image encoded data;

FIG. 20 is a diagram showing a specific example of a feature quantity table of missing data;

FIG. 21 is a diagram showing a specific example of separation information;

FIG. 24 is a flowchart illustrating the operation of the motion image distribution system shown in FIG. 17.

DETAILED DESCRIPTION

Figure 1:
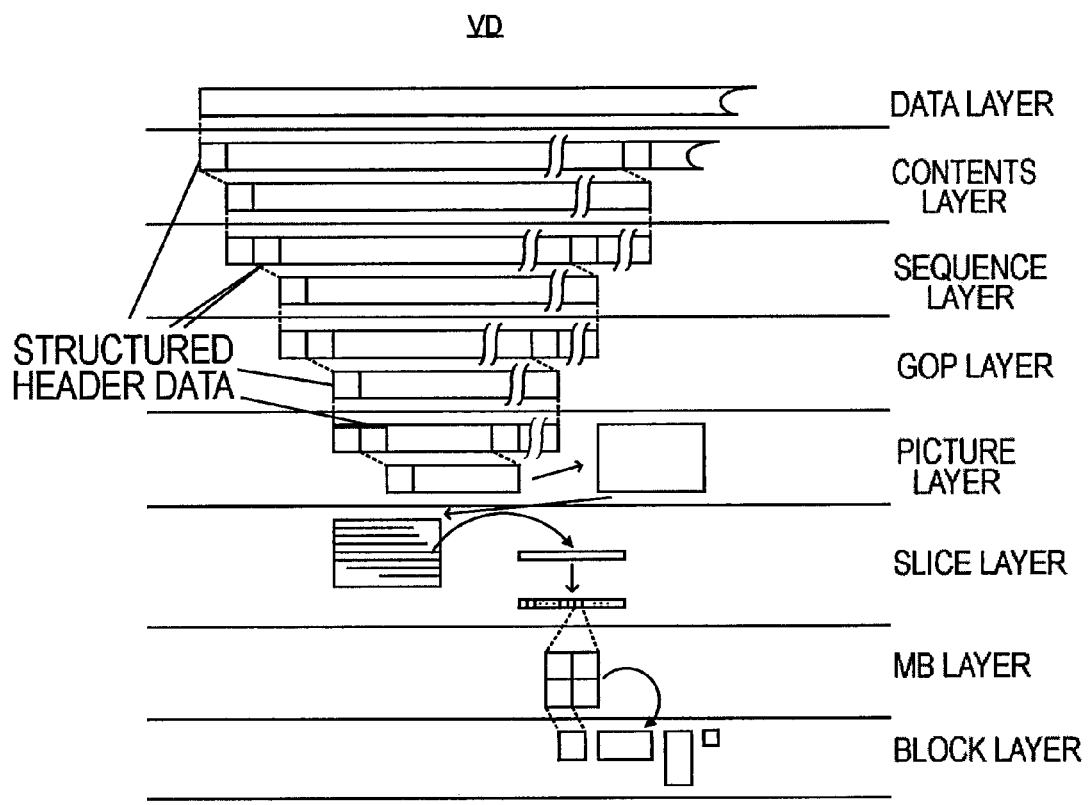
FIG. 1 is a conceptual view showing a data structure of motion image data to be distributed by a motion image distribution system according to another embodiment.

Representative embodiments will now be described in detail with reference to the drawings. In the drawings, the same parts or corresponding parts are represented by the same reference numerals, and descriptions thereof will be omitted.

FIG. 1 is a conceptual view showing a data structure of motion image data to be distributed by a motion image distribution system according to an embodiment. Referring to FIG. 1, motion image data VD to be distributed by the motion image distribution system according to an embodiment includes a data layer, a contents layer, a sequence layer, a GOP (Group Of Picture) layer, a picture layer, a slice layer, and MB (Macro Block) layer, and a block layer.

The contents layer is provided below the data layer, the sequence layer is provided below the contents layer, and the GOP layer is provided below the sequence layer. In addition, the picture layer is provided below the GOP layer, the slice layer is provided below the picture layer, the MB layer is provided below the slice layer, and the block layer is provided below the MB layer.

Data of the contents layer, the sequence layer, the GOP layer, and the picture layer includes structured header data.

Data of the slice layer includes data which is obtained by slicing data of the picture layer in a horizontal direction. Data of the MB layer includes each of a plurality of macro blocks forming data of the slice layer. Data of the block layer includes each of four blocks forming data of the MB layer.

As such, the data layer, the contents layer, the sequence layer, the GOP layer, the picture layer, the slice layer, the MB layer, and the block layer are hierarchically arranged.

Figure 2:
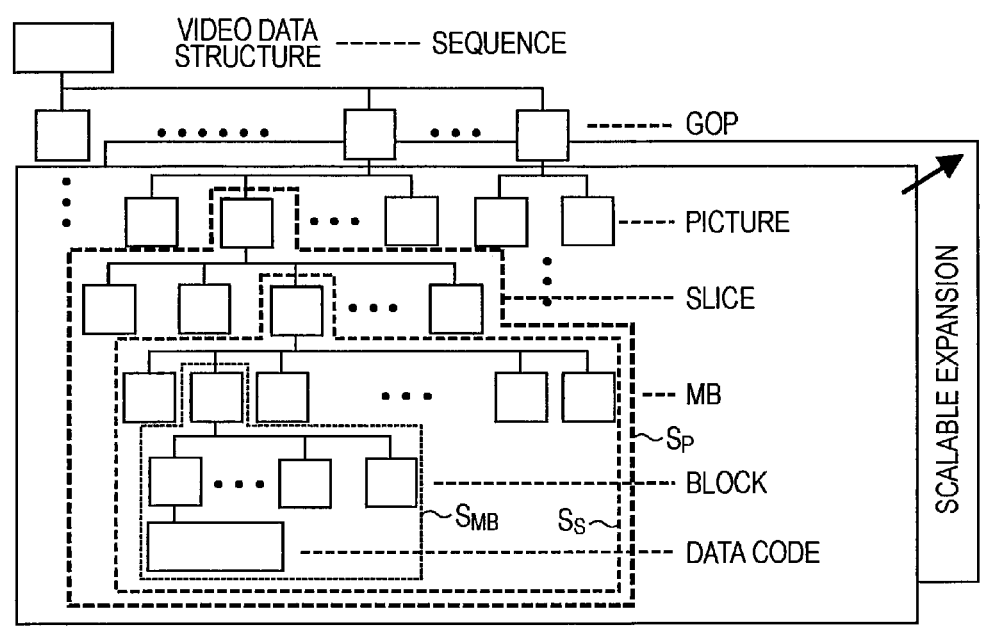
FIG. 2 is a diagram showing an example of a data structure of encoded motion image data.

FIG. 2 is a diagram showing an example of a data structure of encoded motion image data. In FIG. 2, the horizontal direction represents a temporal direction, and the vertical direction represents a hierarchy direction. FIG. 2 also shows an encoded data structure in the hierarchies of the GOP layer and the underlying layers from among the hierarchies shown in FIG. 1. Black rectangles represent encoding type information and a data codes.

Referring to FIG. 2, motion image encoded data includes a video data structure and a sequence. The video data structure includes GOPs, pictures, slices, MBs, and blocks. $S_P$ denotes data of the picture structure, $S_S$ denotes data of the slice structure, and $S_{MB}$ denotes data of the MB structure.

Each GOP includes a plurality of $S_P$, each $S_P$ includes a plurality of $S_S$, and each $S_S$ includes a plurality of $S_{MB}$.

The sequence represents a sequence of a plurality of GOP.

Scalable expansion means, for example, expansion, such as scalability encoding based on MPEG (Motion Picture Expert Group)-2, H.264, and MPEG-4 AVC, or hierarchical encoding of time, space, frequency, and color signal.

It is noted that motion image data is downloaded data or streaming data.

The motion image distribution system according to an embodiment authenticates that motion image data is regular data by using the video data structure shown in FIG. 2 as check information.

A motion image distribution system according to each embodiment will now be described.

First Embodiment

FIG. 3 is a schematic block diagram of a motion image distribution system according to a first embodiment. Referring to FIG. 3, a motion image distribution system 100 of the first embodiment includes a server 10 and a user terminal 20.

The server 10 includes an information generation unit 11, an information registration unit 12, an authentication unit 13, and a transmitting/receiving unit 14. The user terminal 20 includes a transmitting/receiving unit 21, an information generation unit 22, an authentication unit 23, and a playback unit 24.

The information generation unit 11 receives motion image encoded data VDE obtained by encoding motion image data, and generates a feature quantity table CHT1 representing a data structure of motion image encoded data VDE on the basis of received motion image encoded data VDE. The information generation unit 11 registers the generated feature quantity table CHT1 in the information registration unit 12, and outputs the feature quantity table CHT1 to the authentication unit 13 and the transmitting/receiving unit 14.

Each time the information generation unit 11 generates the feature quantity table CHT1, the information registration unit 12 stores the generated feature quantity table CHT1. Therefore, the information registration unit 12 stores the feature quantity tables of various kinds of motion image encoded data. The information registration unit 12 also sequentially outputs a plurality of feature quantity tables to the authentication unit 13 in response to a request to output a feature quantity table from the authentication unit 13.

The authentication unit 13 receives the feature quantity table CHT1 from the information generation unit 11, and also sequentially receives a plurality of feature quantity tables from the information registration unit 12. The authentication unit 13 also sequentially searches a plurality of feature quantity tables and determines whether or not the feature quantity table CHT1 is identical to one of the plurality of feature quantity tables. When the feature quantity table CHT1 is identical to one of the plurality of feature quantity tables, the authentication unit 13 generates an authentication signal VF1 indicating that motion image encoded data VDE is authenticated as regular data, and outputs the generated authentication signal VF1 to the transmitting/receiving unit 14. When the feature quantity table CHT1 is not identical to any one of the plurality of feature quantity tables, the authentication unit 13 generates a non-authentication signal NVF1 indicating that motion image encoded data VDE cannot be authenticated as regular data, and outputs the generated non-authentication signal NVF1 to the transmitting/receiving unit 14.

The transmitting/receiving unit 14 receives motion image encoded data VDE from the outside, receives the feature quantity table CHT1 from the information generation unit 11, and receives the authentication signal VF1 or the non-authentication signal NVF1 from the authentication unit 13. If the authentication signal VF1 is received from the authentication unit 13, the transmitting/receiving unit 14 transmits the feature quantity table CHT1 and motion image encoded data VDE to the user terminal 20.

In this case, the transmitting/receiving unit 14 may simultaneously transmit the feature quantity table CHT1 and motion image encoded data VDE to the user terminal 20, or may separately transmit the feature quantity table CHT1 and motion image encoded data VDE to the user terminal 20.

When the non-authentication signal NVF is received from the authentication unit 13, the transmitting/receiving unit 14 does not transmit the feature quantity table CHT1 and motion image encoded data VDE to the user terminal 20.

The transmitting/receiving unit 21 of the user terminal 20 receives the feature quantity table CHT1 and motion image encoded data VDE from the server 10. The transmitting/receiving unit 21 outputs received motion image encoded data VDE to the information generation unit 22 and the playback unit 24, and also outputs the received feature quantity table CHT1 to the authentication unit 23.

The information generation unit 22 receives motion image encoded data VDE from the transmitting/receiving unit 21. The information generation unit 22 generates a feature quantity table CHT2 representing the data structure of motion image encoded data VDE on the basis of received motion image encoded data VDE, and outputs the generated feature quantity table CHT2 to the authentication unit 23.

The authentication unit 23 receives the feature quantity table CHT1 from the transmitting/receiving unit 21, and also receives the feature quantity table CHT2 from the information generation unit 22. The authentication unit 23 determines whether or not the feature quantity table CHT2 is identical to the feature quantity table CHT1. When the feature quantity table CHT2 is identical to the feature quantity table CHT1, the authentication unit 23 generates an authentication signal VF2 indicating that motion image encoded data VDE received by the transmitting/receiving unit 21 is authenticated as regular data, and outputs the generated authentication signal VF2 to the playback unit 24. When the feature quantity table CHT2 is not identical to the feature quantity table CHT1, the authentication unit 23 generates a non-authentication signal NVF2 indicating that motion image encoded data VDE received by the transmitting/receiving unit 21 cannot be authenticated as regular data, and outputs the generated non-authentication signal NVF2 to the playback unit 24.

The playback unit 24 receives motion image encoded data VDE from the transmitting/receiving unit 21, and also receives the authentication signal VF2 or the non-authentication signal NVF2 from the authentication unit 23. If the authentication signal VF2 is received, the playback unit 24 plays back motion image encoded data VDE. If the non-authentication signal NVF2 is received, the playback unit 24 does not play back motion image encoded data VDE.

As such, if input motion image encoded data VDE is authenticated as regular data, the server 10 transmits the feature quantity table CHT1 and motion image encoded data VDE to the user terminal 20. The user terminal 20 receives the feature quantity table CHT1 and motion image encoded data VDE from the server 10, and if motion image encoded data VDE is authenticated as regular data by using the received feature quantity table CHT1, plays back motion image encoded data.

FIG. 4 is a conceptual view of a feature quantity table in the first embodiment. Referring to FIG. 4, the feature quantity table CHT includes playback time, encoding structure information, an encoding mode, and a bit rate.

The playback time, the encoding structure information, the encoding mode, and the bit rate are associated with each other. The playback time is a playback time of motion image encoded data VDE. The encoding structure information is information regarding the structure of motion image encoded data VDE (GOP and picture shown in FIG. 2). The encoding structure information is information with the pictures shown in FIG. 2 unhierarchized or information with the pictures hierarchized.

The encoding mode includes an array of encoding type information (black rectangles shown in FIG. 2). The bit rate includes the size of corresponding encoding structure information. When the pictures in the encoding structure information are not hierarchized, the bit rate includes the size of each of the unhierarchized pictures. When the pictures in the encoding structure information are hierarchized, the bit rate includes the size of each of the pictures in each hierarchy.

The feature quantity table CHT may include actual data, in addition to the playback time, the encoding structure information, the encoding mode, and the bit rate. Actual data includes a motion vector MV and a quantization coefficient information Q of motion image encoded data.

Therefore, in the first embodiment, the feature quantity table CHT is a table that includes the playback time, the encoding structure information, the encoding mode, and the bit rate as the components, or a table that includes the playback time, the encoding structure information, the encoding mode, the bit rate, and actual data as the components.

FIG. 5 is a diagram showing a specific example of the feature quantity table CHT shown in FIG. 4. Referring to FIG. 5, in a feature quantity table CHT-A, the playback time includes $T_1, T_2, \ldots,$ and $T_T$, the encoding structure information includes $GOP_1, GOP_2, \ldots,$ and $GOP_G$. The encoding mode includes $M_1M_1M_2 \ldots M_2M_3, M_3M_4M_3 \ldots M_NM_2, \ldots,$ and $M_3M_4M_3 \ldots M_2M_1$, and the bit rate includes $GOP_1$ size, $GOP_2$ size, $\ldots,$ and $GOP_G$ size.

Each of $GOP_1, GOP_2, \ldots,$ and $GOP_G$ includes hierarchized $Picture_1 \ldots Picture_P, Slice_1 \ldots Slice_Y,$ and $MB_1 \ldots MB_X$.

$M_1M_1M_2 \ldots M_2M_3$ in the encoding mode is associated with $MB_1$ to $MB_X$ of $GOP_1$, and represents encoding type information in $MB_1$ to $MB_X$ of $GOP_1$. $M_3M_4M_3 \ldots M_NM_2$ in the encoding mode is associated with $MB_1$ to $MB_X$ of $GOP_2$, and represents encoding type information in $MB_1$ to $MB_X$ of $GOP_2$. Similarly, $M_3M_4M_3 \ldots M_2M_1$ in the encoding mode is associated with $MB_1$ to $MB_X$ of $GOP_G$, and represents encoding type information in $MB_1$ to $MB_X$ of $GOP_G$.

In the bit rate, $GOP_1$ size, $GOP_2$ size, $\ldots,$ and $GOP_G$ size individually include $Picture_{1 \ldots P}$ size/$Slice_{1 \ldots Y}$ size/$MB_{1 \ldots X}$ size.

In $GOP_1$ size, $Picture_{1 \ldots P}$ size represents the sizes of $Picture_1$ to $Picture_P$ of $GOP_1$ in the encoding structure information, respectively. In $GOP_1$ size, $Slice_{1 \ldots Y}$ size represents the sizes of $Slice_1$ to $Slice_Y$ of $GOP_1$ in the encoding structure information, respectively. In $GOP_1$ size, $MB_{1 \ldots X}$ size represents the sizes of $MB_1$ to $MB_X$ of $GOP_1$ in the encoding structure information, respectively.

The same is applied to $Picture_{1 \ldots P}$ size, $Slice_{1 \ldots Y}$ size, and $MB_{1 \ldots X}$ size in each of $GOP_2$ size, $\ldots,$ and $GOP_G$ size.

The information generation unit 11 shown in FIG. 3 extracts the playback time with reference to input motion image encoded data VDE. The information generation unit 11 also extracts a sequence, G GOPs, P pictures in each GOP, Y slices in each picture, and X MBs in each slice with reference to the data structure of motion image encoded data VDE (see FIG. 2).

The information generation unit 11 extracts X number of encoding type information from the extracted X MBs in each GOP, and arranges the X number of extracted encoding type information to create the encoding mode. Specifically, the information generation unit 11 extracts X number of encoding type information $M_1, M_1, M_2, \ldots, M_2,$ and $M_3$ from the X number of $MB_1$ to $MB_X$ in $GOP_1$, and arranges the X number of extracted encoding type information $M_1, M_1, M_2, \ldots, M_2,$ and $M_3$ to create the encoding mode $M_1M_1M_2 \ldots M_2M_3$. The information generation unit 11 also extracts X number of encoding type information $M_3, M_4, M_3, \ldots, M_N,$ and $M_2$ from the X number of $MB_1$ to $MB_X$ in $GOP_2$, and arranges the X number of extracted encoding type information $M_3, M_4, M_3, \ldots, M_N,$ and $M_2$ to create the encoding mode $M_3M_4M_3 \ldots M_NM_2$. Similarly, the information generation unit 11 extracts X number of encoding type information $M_3, M_4, M_3, \ldots, M_2,$ and $M_1$ from the X number of $MB_1$ to $MB_X$ in $GOP_G$, and arranges the X number of extracted encoding type information $M_3, M_4, M_3, \ldots, M_2,$ and $M_1$ to create the encoding mode $M_3M_4M_3 \ldots M_2M_1$.

The information generation unit 11 also creates $GOP_1$ to $GOP_G$ representing the extracted G GOPs, creates $Picture_1$ to $Picture_P$ representing the extracted P pictures in each GOP, creates $Slice_1$ to $Slice_Y$ representing the extracted Y slices in each picture, and creates $MB_1$ to $MB_X$ representing the extracted X MBs in each slice. The information generation unit 11 also creates $GOP_1/Picture_1 \ldots Picture_P/Slice_1 \ldots Slice_Y/MB_1 \ldots MB_X, GOP_2/Picture_1 \ldots Picture_P/Slice_1 \ldots Slice_Y/MB_1 \ldots MB_X, \ldots,$ and $GOP_G/Picture_1 \ldots Picture_P/Slice_1 \ldots Slice_Y/MB_1 \ldots MB_X$.

The information generation unit 11 calculates the size of the extracted sequence, the sizes of the extracted G GOPs, the sizes of the extracted P pictures in each GOP, the sizes of the extracted Y slices in each picture, and the sizes of the extracted X MBs in each slice. The information generation unit 11 creates $GOP_1$ size/$Picture_{1 \ldots P}$ size/$Slice_{1 \ldots Y}$ size/$MB_{1 \ldots X}$ size, $GOP_2$ size/$Picture_{1 \ldots P}$ size/$Slice_{1 \ldots Y}$ size/$MB_{1 \ldots X}$ size, $\ldots,$ and $GOP_G$ size/$Picture_{1 \ldots P}$ size/$Slice_{1 \ldots Y}$ size/$MB_{1 \ldots X}$ size.

The information generation unit 11 stores the extracted playback time in the playback time of the feature quantity table CHT-A, and stores the extracted sequence and the created $GOP_1/Picture_1 \ldots Picture_P/Slice_1 \ldots Slice_Y/MB_1 \ldots MB_X, GOP_2/Picture_1 \ldots Picture_P/Slice_1 \ldots Slice_Y/MB_1 \ldots MB_X, \ldots,$ and $GOP_G/Picture_1 \ldots Picture_P/Slice_1 \ldots Slice_Y/MB_1 \ldots MB_X$ in the encoding structure information. The information generation unit 11 also stores created $M_1M_1M_2 \ldots M_2M_3, M_3M_4M_3 \ldots M_NM_2, \ldots,$ and $M_3M_4M_3 \ldots M_2M_1$ in the encoding mode in association with $MB_1$ to $MB_X$ of $GOP_1$ to $GOP_G$, respectively. The information generation unit 11 also stores calculated Sequence size and created $GOP_1$ size/$Picture_{1 \ldots P}$ size/$Slice_{1 \ldots Y}$ size/$MB_{1 \ldots X}$ size, $GOP_2$ size/$Picture_{1 \ldots P}$ size/$Slice_{1 \ldots Y}$ size/$MB_{1 \ldots X}$ size, $\ldots,$ and $GOP_G$ size/$Picture_{1 \ldots P}$ size/$Slice_{1 \ldots Y}$ size/$MB_{1 \ldots X}$ size in the bit rate in association with the sequence, Picture$_1$ ... Picture$_P$/Slice$_1$ ... Slice$_Y$/MB$_1$ ... MB$_X$ of GOP$_1$ to GOP$_G$. Thus, the feature quantity table CHT-A is created.

The information generation unit 22 of the user terminal 20 creates the feature quantity table CHT-A with reference to the data structure of motion image encoded data VDE received by the transmitting/receiving unit 21 in the same manner as the information generation unit 11.

FIG. 6 is a diagram showing another specific example of the feature quantity table CHT shown in FIG. 4. Referring to FIG. 6, a feature quantity table CHT-B is different from the feature quantity table CHT-A shown in FIG. 5 in that actual data is further included. Other parts of the feature quantity table CHT-B are the same as those in the feature quantity table CHT-A.

Actual data includes motion vectors MV$_1$ to MV$_G$, and the motion vectors MV$_1$ to MV$_G$ are individually associated with GOP$_1$ to GOP$_G$.

In order to create the feature quantity table CHT-B shown in FIG. 6, in addition to the operation to create the feature quantity table CHT-A shown in FIG. 5, the information generation unit 11 shown in FIG. 3 detects the motion vectors MV$_1$ to MV$_G$ in the G number of GOP$_1$ to GOP$_G$ from motion image encoded data VDE, and stores the detected motion vectors MV$_1$ to MV$_G$ as actual data. Thus, the feature quantity table CHT-B is created.

The information generation unit 22 shown in FIG. 3 creates the feature quantity table CHT-B on the basis of motion image encoded data VDE received by transmitting/receiving unit 21 in the same manner as the information generation unit 11.

In the feature quantity table CHT-B, actual data may include quantization coefficient information Q$_1$ to Q$_G$, instead of the motion vectors MV$_1$ to MV$_G$.

FIG. 7 is a diagram showing yet another example of the feature quantity table CHT shown in FIG. 4. Referring to FIG. 7, a feature quantity table CHT-C is different from the feature quantity table CHT-A shown in FIG. 5 in that encoding structure information, encoding mode, and bit rate are substituted with encoding structure information, encoding mode, and bit rate when the pictures in the data structure of motion image encoded data VDE are hierarchized. Other parts of the feature quantity table CHT-C are the same as those in the feature quantity table CHT-A.

When the pictures in the data structure of motion image encoded data VDE are separated into a base layer L and an enhanced layer H, in each of GOP$_1$ to GOP$_G$ of encoding structure information, Picture$_1$ to Picture$_P$ include L-Picture$_1$ to L-Picture$_P$ and H-Picture$_1$ to H-Picture$_P$.

Therefore, the encoding structure information of GOP$_1$ includes GOP$_1$/L-Picture$_1$ to L-Picture$_P$/Slice$_1$ to Slice$_Y$/MB$_1$ to MB$_X$/H-Picture$_1$ to H-Picture$_P$/Slice$_1$ to Slice$_Y$/MB$_1$ to MB$_X$. Similarly, the encoding structure information of GOP$_G$ includes GOP$_G$/L-Picture$_1$ to L-Picture$_P$/Slice$_1$ to Slice$_Y$/MB$_1$ to MB$_X$/H-Picture$_1$ to H-Picture$_P$/Slice$_1$ to Slice$_Y$/MB$_1$ to MB$_X$.

The encoding mode of GOP$_1$ includes M$_3$M$_4$M$_3$ ... M$_N$M$_2$ corresponding to L-Picture$_1$ to L-Picture$_P$/Slice$_1$ to Slice$_Y$/MB$_1$ to MB$_X$ of GOP$_1$, and M$_1$M$_1$M$_2$ ... M$_2$M$_3$ corresponding to H-Picture$_1$ to H-Picture$_P$/Slice$_1$ to Slice$_Y$/MB$_1$ to MB$_X$ of GOP$_1$. Similarly, the encoding mode of GOP$_G$ includes M$_3$M$_4$M$_3$ ... M$_2$M$_1$ corresponding to L-Picture$_1$ to L-Picture$_P$/Slice$_1$ to Slice$_Y$/MB$_1$ to MB$_X$ of GOP$_G$, and M$_3$M$_4$M$_3$ ... M$_N$M$_2$ corresponding to H-Picture$_1$ to H-Picture$_P$/Slice$_1$ to Slice$_Y$/MB$_1$ to MB$_X$ of GOP$_G$.

The bit rate of GOP$_1$ includes GOP$_1$ size/L-Picture$_1$ ... $_P$ size/Slice$_1$ to Slice$_Y$ size/MB$_1$ to MB$_X$ size/H-Picture$_1$ ... $_P$ size/Slice$_1$ to Slice$_Y$ size/MB$_1$ to MB$_X$ size. Similarly, the bit rate of GOP$_G$ includes GOP$_G$ size/L-Picture$_1$ ... $_P$ size/Slice$_1$ to Slice$_Y$ size/MB$_1$ to MB$_X$ size/H-Picture$_1$ ... $_P$ size/Slice$_1$ to Slice$_Y$ size/MB$_1$ to MB$_X$ size.

When the pictures in the data structure of motion image encoded data VDE are hierarchized, the pictures are separated into the base layer L and the enhanced layer H. Therefore, the information generation units 11 and 22 shown in FIG. 3 extract the separated base layer L and enhanced layer H of the pictures, and create the feature quantity table CHT-C in accordance with the above-described operation.

As such, if the pictures in the data structure of motion image encoded data VDE are hierarchized into the base layer L and the enhanced layer H, the playback unit 24 of the user terminal 20 hierarchically synthesizes the enhanced layer H to the base layer L, thereby playing back motion image encoded data VDE as a high-definition image.

An example where the pictures are hierarchized into the base layer L and the enhanced layer H has been described. The pictures may be hierarchized into a plurality of layers. In this case, the enhanced layer H is further separated, and the pictures are hierarchized. Therefore, the feature quantity table CHT-C includes hierarchized encoding structure information, encoding mode, and bit rate depending on the number of hierarchies of the pictures of motion image encoded data VDE.

In the first embodiment, the information generation unit 11 generates the feature quantity table CHT1, which is one of the feature quantity tables CHT-A, CHT-B, and CHT-C. The information generation unit 22 generates the feature quantity table CHT2, which is one of the feature quantity tables CHT-A, CHT-B, and CHT-C.

FIG. 8 is a flowchart illustrating the operation of the motion image distribution system 100 shown in FIG. 3.

Referring to FIG. 8, if a sequence of operations start, the information generation unit 11 of the server 10 receives motion image encoded data VDE from the outside, and generates the feature quantity table CHT1 (one of the feature quantity tables CHT-A, CHT-B, and CHT-C) representing the data structure of motion image encoded data VDE on the basis of received motion image encoded data VDE (Step S1).

Next, the information generation unit 11 of the server 10 outputs the generated feature quantity table CHT1 to the authentication unit 13 and the transmitting/receiving unit 14, and registers the feature quantity table CHT1 in the information registration unit 12.

Next, the authentication unit 13 of the server 10 sequentially searches a plurality of feature quantity tables registered in the information registration unit 12, and determines whether or not the feature quantity table CHT1 received from the information generation unit 11 is identical to one of the plurality of feature quantity tables. If the feature quantity table CHT1 is identical to one of the plurality of feature quantity table, the authentication unit 13 generates the authentication signal VF1 and outputs the generated authentication signal VF1 to the transmitting/receiving unit 14. That is, the authentication unit 13 authenticates motion image encoded data VDE by using the feature quantity table CHT1 (Step S2).

The transmitting/receiving unit 14 of the server 10 receives motion image encoded data VDE from the outside, and receives the feature quantity table CHT1 from the information generation unit 11. Then, if the authentication signal VF1 is received from the authentication unit 13, the transmitting/receiving unit 14 transmits the feature quantity table CHT1 and motion image encoded data VDE to the user terminal 20 (Step S3).

The transmitting/receiving unit 21 of the user terminal 20 receives the feature quantity table CHT1 and motion image encoded data VDE (Step S4). The transmitting/receiving unit 21 outputs received motion image encoded data VDE to the information generation unit 22 and the playback unit 24, and also outputs the received feature quantity table CHT1 to the authentication unit 23.

The information generation unit 22 of the user terminal 20 generates the feature quantity table CHT2 (one of the feature quantity tables CHT-A, CHT-B, and CHT-C) representing the data structure of motion image encoded data VDE on the basis of motion image encoded data VDE received from the transmitting/receiving unit 21 (Step S5). Then, the information generation unit 22 outputs the generated feature quantity table CHT2 to the authentication unit 23.

Next, the authentication unit 23 of the user terminal 20 receives the feature quantity table CHT1 from the transmitting/receiving unit 21, and also receives the feature quantity table CHT2 from the information generation unit 22. The authentication unit 23 of the user terminal 20 determines whether or not the feature quantity table CHT2 is identical to the feature quantity table CHT1 (Step S6). In this case, the authentication unit 23 determines whether or not the playback time, the encoding structure information, the encoding mode, and the bit rate in the feature quantity table CHT2 are identical to the playback time, the encoding structure information, the encoding mode, and the bit rate in the feature quantity table CHT1, respectively, to thereby determine whether or not the feature quantity table CHT2 is identical to the feature quantity table CHT1.

In Step S6, if it is determined that the feature quantity table CHT2 is identical to the feature quantity table CHT1, the authentication unit 23 of the user terminal 20 generates the authentication signal VF2 indicating that motion image encoded data VDE received by the transmitting/receiving unit 21 is regular data, and outputs the generated authentication signal VF2 to the playback unit 24.

Next, the playback unit 24 of the user terminal 20 receives motion image encoded data VDE from the transmitting/receiving unit 21. Upon receiving the authentication signal VF2 from the authentication unit 23, playback unit 24 plays back motion image encoded data VDE (Step S7), and outputs motion image playback information to the outside.

In Step S6, if it is determined that the feature quantity table CHT2 is not identical to the feature quantity table CHT1, the authentication unit 23 of the user terminal 20 generates the non-authentication signal NVF2 indicating that motion image encoded data VDE is not regular data, and outputs the generated non-authentication signal NVF2 to the playback unit 24. Upon receiving the non-authentication signal NVF2, the playback unit 24 does not play back motion image encoded data VDE. Therefore, in Step S6, when it is determined that the feature quantity table CHT2 is not identical to the feature quantity table CHT1, motion image encoded data VDE is not played back, and the sequence of operations is ended.

As described above, the server 10 authenticates input motion image encoded data VDE and transmits the feature quantity table CHT1 and motion image encoded data VDE to the user terminal 20. The user terminal 20 receives the feature quantity table CHT1 and motion image encoded data VDE, and generates the feature quantity table CHT2 representing the data structure of received motion image encoded data VDE. When the feature quantity table CHT2 is identical to the feature quantity table CHT1, the user terminal 20 authenticates motion image encoded data VDE as regular data, and plays back motion image encoded data VDE.

Therefore, according to this embodiment, it is possible to authenticate motion image encoded data VDE on the basis of the data structure of motion image encoded data VDE with no authentication data area.

The user terminal 20 plays back motion image encoded data VDE only when motion image encoded data can be authenticated as regular data. Therefore, only a regular user terminal having a mechanism for the above-described authentication processing can play back motion image encoded data VDE. As a result, motion image encoded data VDE can be distributed to only a regular user terminal.

In the first embodiment, the server 10 may encrypt the feature quantity table CHT1 and motion image encoded data VDE, and may simultaneously or separately transmit the encrypted feature quantity table CHT1 and motion image encoded data VDE to the user terminal 20.

In this case, the user terminal 20 transmits its unique ID to the server 10. If the server 10 determines that the user terminal 20 is a regular user terminal, the user terminal 20 receives an encryption key from the server 10, and decrypts the encrypted feature quantity table CHT1 and motion image encoded data VDE by using the received encryption key.

In the first embodiment, the feature quantity table CHT1 constitutes "first structure information", and the feature quantity table CHT2 constitutes "second structure information".

In the first embodiment, the information registration unit 12 constitutes a "database".

Second Embodiment

FIG. 9 is a schematic block diagram of a motion image distribution system according to a second embodiment. Referring to FIG. 9, a motion image distribution system 200 according to a second embodiment includes a server 210 and a user terminal 220.

The server 210 includes an information generation unit 211, an information registration unit 212, an authentication unit 213, and a transmitting/receiving unit 214. The user terminal 220 includes a transmitting/receiving unit 221, an information generation unit 222, an authentication unit 223, and a playback unit 224.

If motion image encoded data VDE is received from the outside, the information generation unit 211 of the server 210 rearranges a plurality of encoding type information of the MBs in the data structure of motion image encoded data VDE on the basis of received motion image encoded data VDE. Thus, motion image encoded data VDE is converted into motion image encoded data VDEC.

The information generation unit 211 generates a feature quantity table CHT3 representing a data structure of motion image encoded data VDEC.

The information generation unit 211 outputs the generated feature quantity table CHT3 to the authentication unit 213 and the transmitting/receiving unit 214, and also registers the feature quantity table CHT3 in the information registration unit 212. The information generation unit 211 also outputs generated motion image encoded data VDEC to the transmitting/receiving unit 214.

The information registration unit 212 stores the feature quantity tables CHT3 of various kinds of motion image encoded data VDE, a plurality of encoding type information arranged in a regular array, and a plurality of rearranged encoding type information in association with each other.

The information registration unit 212 sequentially outputs a plurality of feature quantity tables CHT3 to the authentication unit 213 in response to a request to output the feature quantity table CHT3 from the authentication unit 213.

The information registration unit 212 outputs a plurality of encoding type information arranged in a regular array to the transmitting/receiving unit 214 in response to a request to output a plurality of encoding type information arranged in a regular array from the transmitting/receiving unit 214.

The authentication unit 213 receives the feature quantity table CHT3 from the information generation unit 211. The authentication unit 213 also outputs the request to output the feature quantity table CHT3 to the information registration unit 212, and sequentially receives the plurality of feature quantity tables CHT3 from the information registration unit 212. To distinguish the feature quantity table CHT3 from the information registration unit 212 from the feature quantity table CHT3 from the information generation unit 211, the plurality of feature quantity tables CHT3 received from the information registration unit 212 are referred to as a plurality of feature quantity tables CHT3'. The authentication unit 213 sequentially searches the plurality of feature quantity tables CHT3', and determines whether or not the feature quantity table CHT3 is identical one of the plurality of feature quantity tables CHT3'. If the feature quantity table CHT3 is identical to one of the plurality of feature quantity tables CHT3', the authentication unit 213 generates the authentication signal VF1 and outputs the generated authentication signal VF1 to the transmitting/receiving unit 214. If the feature quantity table CHT3 is not identical to any one of the plurality of feature quantity table CHT3', the authentication unit 213 generates the non-authentication signal NVF1 and outputs the generated non-authentication signal NVF1 to the transmitting/receiving unit 214.

The transmitting/receiving unit 214 receives motion image encoded data VDEC and the feature quantity table CHT3 from the information generation unit 211, and also receives the authentication signal VF1 or the non-authentication signal NVF1 from the authentication unit 213.

If the authentication signal VF1 is received from the authentication unit 213, the transmitting/receiving unit 214 transmits the feature quantity table CHT3 and motion image encoded data VDEC to the user terminal 220. If the non-authentication signal NVF1 is received from the authentication unit 213, the transmitting/receiving unit 214 does not transmit the feature quantity table CHT3 and motion image encoded data VDEC to the user terminal 220.

If the request to transmit a plurality of encoding type information arranged in a regular array is received from the user terminal 220, the transmitting/receiving unit 214 outputs the received request to the information registration unit 212. If a plurality of encoding type information arranged in a regular array is received from the information registration unit 212, the transmitting/receiving unit 214 transmits the plurality of received encoding type information to the user terminal 220.

The transmitting/receiving unit 221 of the user terminal 220 receives the feature quantity table CHT3 and motion image encoded data VDEC from the server 210. The transmitting/receiving unit 221 outputs received motion image encoded data VDEC to the information generation unit 222, and also outputs the received feature quantity table CHT3 to the authentication unit 223.

The transmitting/receiving unit 221 receives the authentication signal VF2 or the non-authentication signal NVF2 from the authentication unit 223. If the authentication signal VF2 is received, the transmitting/receiving unit 221 transmits the request to transmit a plurality of encoding type information arranged in a regular array to the server 210. If a plurality of encoding type information arranged in a regular array is received from the server 210, the transmitting/receiving unit 221 outputs a plurality of received encoding type information arranged in a regular array and motion image encoded data VDEC to the playback unit 224.

If the non-authentication signal NVF2 is received, the transmitting/receiving unit 221 does not transmit the request to transmit a plurality of encoding type information arranged in a regular array to the server 210.

The information generation unit 222 receives motion image encoded data VDEC from the transmitting/receiving unit 221, and generates a feature quantity table CHT4 representing the data structure of motion image encoded data VDEC on the basis of received motion image encoded data VDEC. The information generation unit 222 outputs the generated feature quantity table CHT4 to the authentication unit 223.

The authentication unit 223 receives the feature quantity table CHT3 from the transmitting/receiving unit 221, and also receives the feature quantity table CHT4 from the information generation unit 222. The authentication unit 223 determines whether or not the feature quantity table CHT4 is identical to the feature quantity table CHT3. When the feature quantity table CHT4 is identical to the feature quantity table CHT3, the authentication unit 223 authenticates motion image encoded data VDE as regular data, generates the authentication signal VF2, and outputs the generated authentication signal VF2 to the transmitting/receiving unit 221. When the feature quantity table CHT4 is not identical to the feature quantity table CHT3, the authentication unit 223 determines that motion image encoded data VDE is not regular data, generates the non-authentication signal NVF2, and outputs the generated non-authentication signal NVF2 to the transmitting/receiving unit 221.

If motion image encoded data VDEC and a plurality of encoding type information arranged in a regular array are received from the transmitting/receiving unit 221, the playback unit 224 converts a plurality of encoding type information of the MBs in the data structure of motion image encoded data VDEC into a plurality of encoding type information arranged in a regular array on the basis of a plurality of received encoding type information arranged in a regular array to thereby generate motion image encoded data VDE, and plays back generated motion image encoded data VDE. The playback unit 224 also outputs the motion image playback information to the outside.

Figure 10:
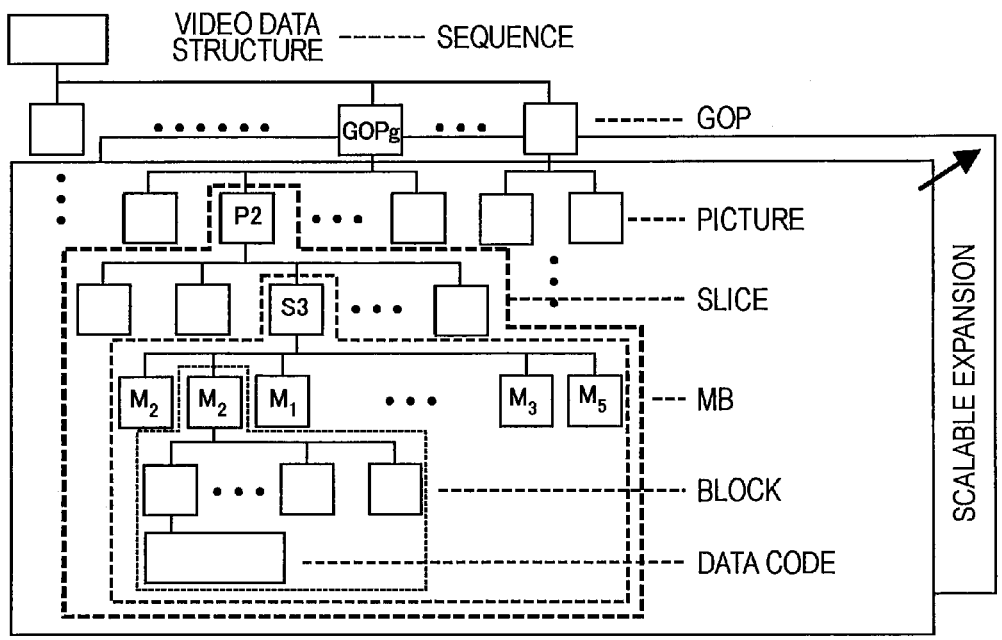
FIG. 10 is a conceptual view of a data structure of motion image encoded data having encoding type information arranged in a regular array.
Figure 11:
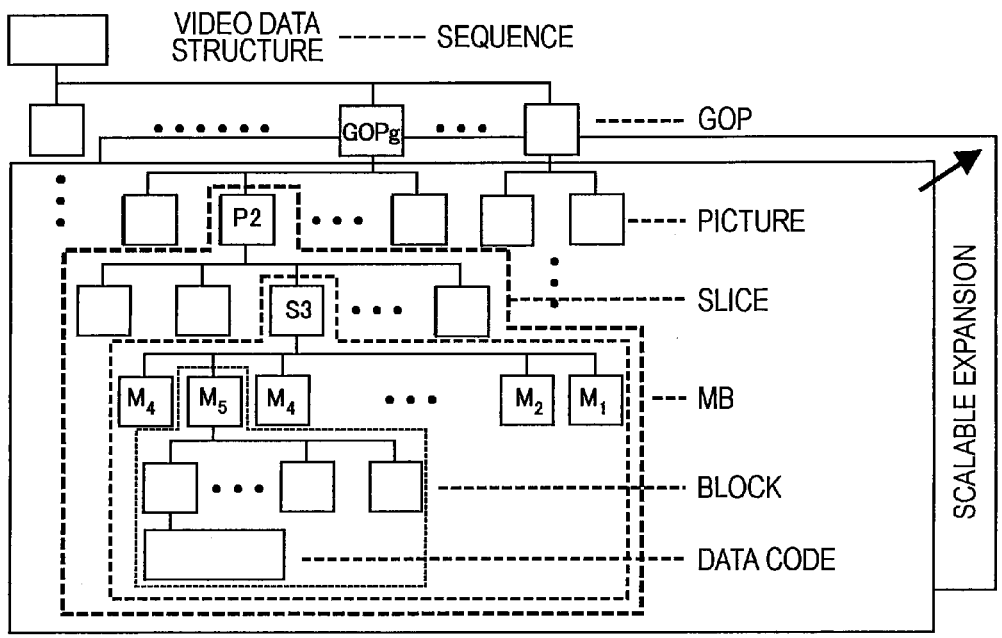
FIG. 11 is a conceptual view of a data structure of a motion image encoded data having rearranged encoding type information.

FIG. 10 is a conceptual view of the data structure of motion image encoded data VDE having encoding type information arranged in a regular array. FIG. 11 is a conceptual view of the data structure of motion image encoded data VDEC having rearranged encoding type information.

The information generation unit 211 of the server 210 receives motion image encoded data VDE having the data structure shown in FIG. 10 from the outside. FIG. 10 shows an array $M_2M_2M_1 \ldots M_3M_5$ of encoding type information in a third slice (S3) of a second picture (P2) of a g-th GOP ($GOP_g$).

If motion image encoded data VDE is received, the information generation unit 211 rearranges the array $(M_2M_2M_1 \ldots M_3M_5$ or the like) of encoding type information in each of $GOP_1$ to $GOP_G$ with reference to the data structure of motion image encoded data VDE, to thereby generate motion image encoded data VDEC.

That is, the information generation unit 211 rearranges the array $M_2M_2M_1 \ldots M_3M_5$ of encoding type information in the third slice (S3) of the second picture (P2) of the g-th GOP ($GOP_g$) to an array $M_4M_5M_4 \ldots M_2M_1$ of encoding type information. Similarly, for $GOP_1$ to $GOP_{g-1}$ and $GOP_{g+1}$ to $GOP_G$, other than $GOP_g$, the information generation unit 211 rearranges the array of encoding type information.

The information generation unit 211 generates motion image encoded data VDEC having the data structure shown in FIG. 11.

Then, the information generation unit 211 generates the feature quantity table CHT3 on the basis of motion image encoded data VDEC having the data structure (see FIG. 11), in which the array of encoding type information is rearranged, in the same manner as the first embodiment.

The information generation unit 211 extracts the arrays CTI ($M_2M_2M_1 \ldots M_3M_5$ and the like) of encoding type information from motion image encoded data VDE having the data structure (see FIG. 10) in which encoding type information is arranged in a regular array. Simultaneously, the information generation unit 211 extracts the arrays CTIC ($M_4M_5M_4 \ldots M_2M_1$ and the like) of the encoding type information from motion image encoded data VDEC having the data structure (see FIG. 11) in which encoding type information is rearranged. The information generation unit 211 registers the extracted arrays CTI ($M_2M_2M_1 \ldots M_3M_5$ and the like) and CTIC ($M_4M_5M_4 \ldots M_2M_1$ and the like) of encoding type information and the generated feature quantity table CHT3 in the information registration unit 212 in association with each other.

FIG. 12 is a conceptual view of a feature quantity table in the second embodiment. Referring to FIG. 12, a feature quantity table CHTT in the second embodiment is different from the feature quantity table CHT shown in FIG. 4 in that the encoding mode is substituted with a rearrangement encoding mode. Other parts are the same as those in the feature quantity table CHT.

The rearrangement encoding mode includes rearranged encoding type information. In the example of FIG. 11, the rearrangement encoding mode includes an array CTIC=$M_4M_5M_4 \ldots M_2M_1$ of encoding type information.

FIG. 13 is a diagram showing a specific example of the feature quantity table CHTT in the second embodiment. Referring to FIG. 13, in a feature quantity table CHTT-A, in the rearrangement encoding mode corresponding to $GOP_1$/$Picture_1 \ldots Picture_P$/$Slice_1 \ldots Slice_Y$/$MB_1 \ldots MB_X$, instead of a regular array $M_1M_1M_2 \ldots M_2M_3$, a rearranged array $M_3M_4M_3 \ldots M_NM_2$ is stored. In the rearrangement encoding mode corresponding to $GOP_2$/$Picture_1 \ldots Picture_P$/$Slice_1 \ldots Slice_Y$/$MB_1 \ldots MB_X$, instead of a regular array $M_3M_4M_3 \ldots M_NM_2$, a rearranged array $M_1M_1M_2 \ldots M_2M_3$ is stored. Similarly, in the rearrangement encoding mode corresponding to $GOP_G$/$Picture_1 \ldots Picture_P$/$Slice_1 \ldots Slice_Y$/$MB_1 \ldots MB_X$, instead of a regular array $M_3M_4M_3 \ldots M_2M_1$, a rearranged array $M_3M_2M_1 \ldots M_5M_2$ is stored.

As another specific example of the feature quantity table CHTT, a feature quantity table may be used in which actual data including the motion vectors $MV_1$ to $MV_G$ or the quantization coefficient information $Q_1$ to $Q_G$ is further included, in addition to the items of the feature quantity table CHTT-A.

As another specific example of the feature quantity table CHTT, a feature quantity table may be used in which the encoding structure information, the rearrangement encoding mode, and the bit rate in the feature quantity table CHTT-A are hierarchized, like the feature quantity table CHT-C (see FIG. 7).

Figure 14:
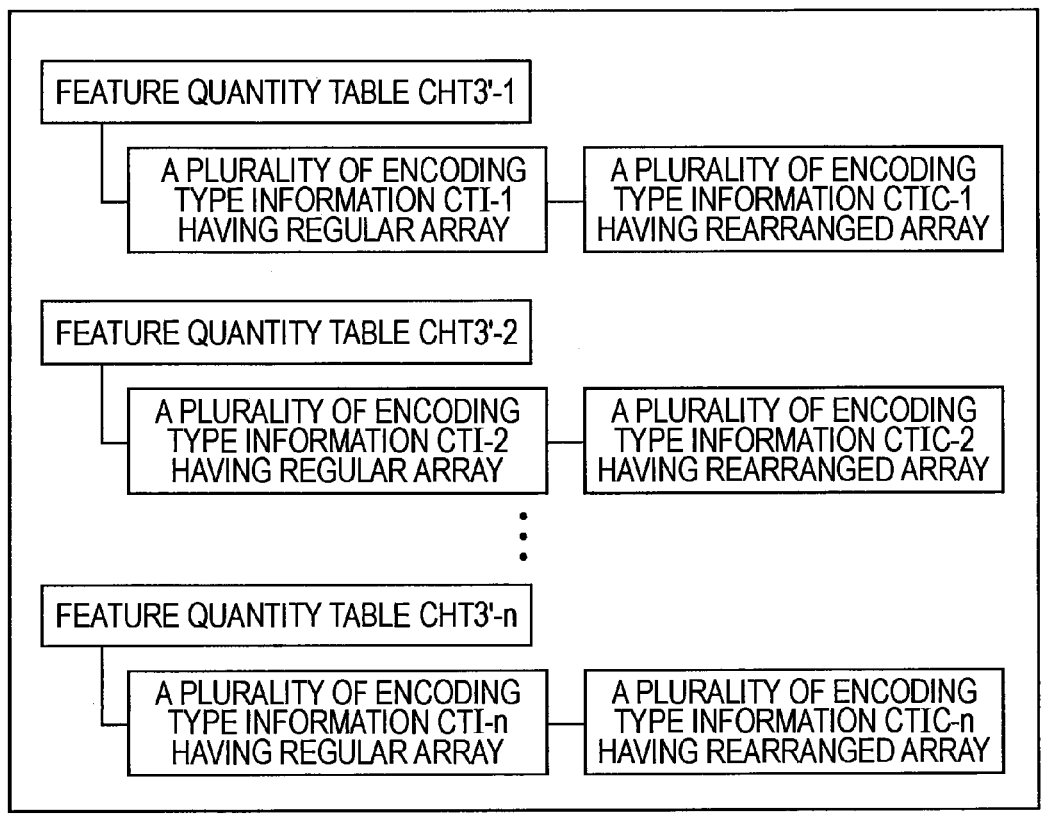
FIG. 14 is a conceptual view showing a registration content in an information registration unit of FIG. 9.

FIG. 14 is a conceptual view showing a registration content in the information registration unit 212 of FIG. 9. Referring to FIG. 14, the information registration unit 212 stores feature quantity tables CHT3'-1 to CHT3'-$n$, a plurality of encoding type information CTI-1 to CTI-n arranged in a regular array, and a plurality of rearranged encoding type information CTIC-1 to CTIC-n.

A plurality of encoding type information CTI-1 and a plurality of encoding type information CTIC-1 are associated with the feature quantity table CHT3'-1, and a plurality of encoding type information CTI-2 and a plurality of encoding type information CTIC-2 are associated with the feature quantity table CHT3'-2. Similarly, a plurality of encoding type information CTI-n and a plurality of encoding type information CTIC-n are associated with the feature quantity table CHT3'-$n$.

Figure 15:
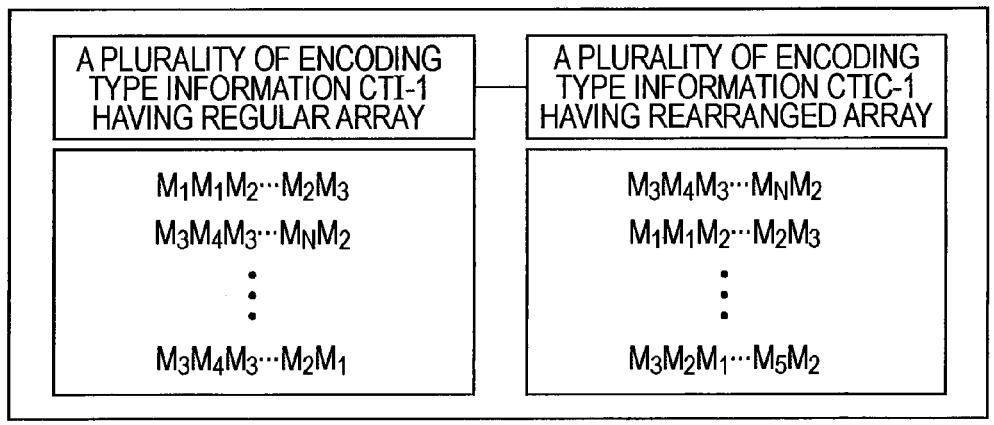
FIG. 15 is a diagram showing a specific example of the correspondence relationship between a plurality of encoding type information arranged in a regular array and a plurality of rearranged encoding type information.

FIG. 15 is a diagram showing a specific example of the correspondence relationship between a plurality of encoding type information CTI-1 arranged in a regular array and a plurality of rearranged encoding type information CTIC-1.

Referring to FIG. 15, a plurality of encoding type information CTI-1 includes the arrays $M_1M_1M_2 \ldots M_2M_3$/$M_3M_4M_3 \ldots M_NM_2$/$\ldots$/$M_3M_4M_3 \ldots M_2M_1$, and a plurality of encoding type information CTIC-1 includes the arrays $M_3M_4M_3 \ldots M_NM_2$/$M_1M_1M_2 \ldots M_2M_3$/$\ldots$/$M_3M_2M_1 \ldots M_5M_2$. The same is applied to the correspondence relationship between a plurality of encoding type information CTI-2 to CTI-n and a plurality of encoding type information CTIC-2 to CTIC-n.

If a request to output a feature quantity table is received from the authentication unit 213, the information registration unit 212 sequentially outputs the feature quantity tables CHT3'-1 to CHT3'-$n$ to the authentication unit 213. If a request to output encoding type information arranged in a regular array corresponding to a feature quantity table CHT3'-$i$ (where i=1 to n) is received from the transmitting/receiving unit 214, the information registration unit 212 outputs a plurality of encoding type information CTI-i stored in association with the feature quantity table CHT3'-$i$ (where i=1 to n) to the transmitting/receiving unit 214.

Figure 16:
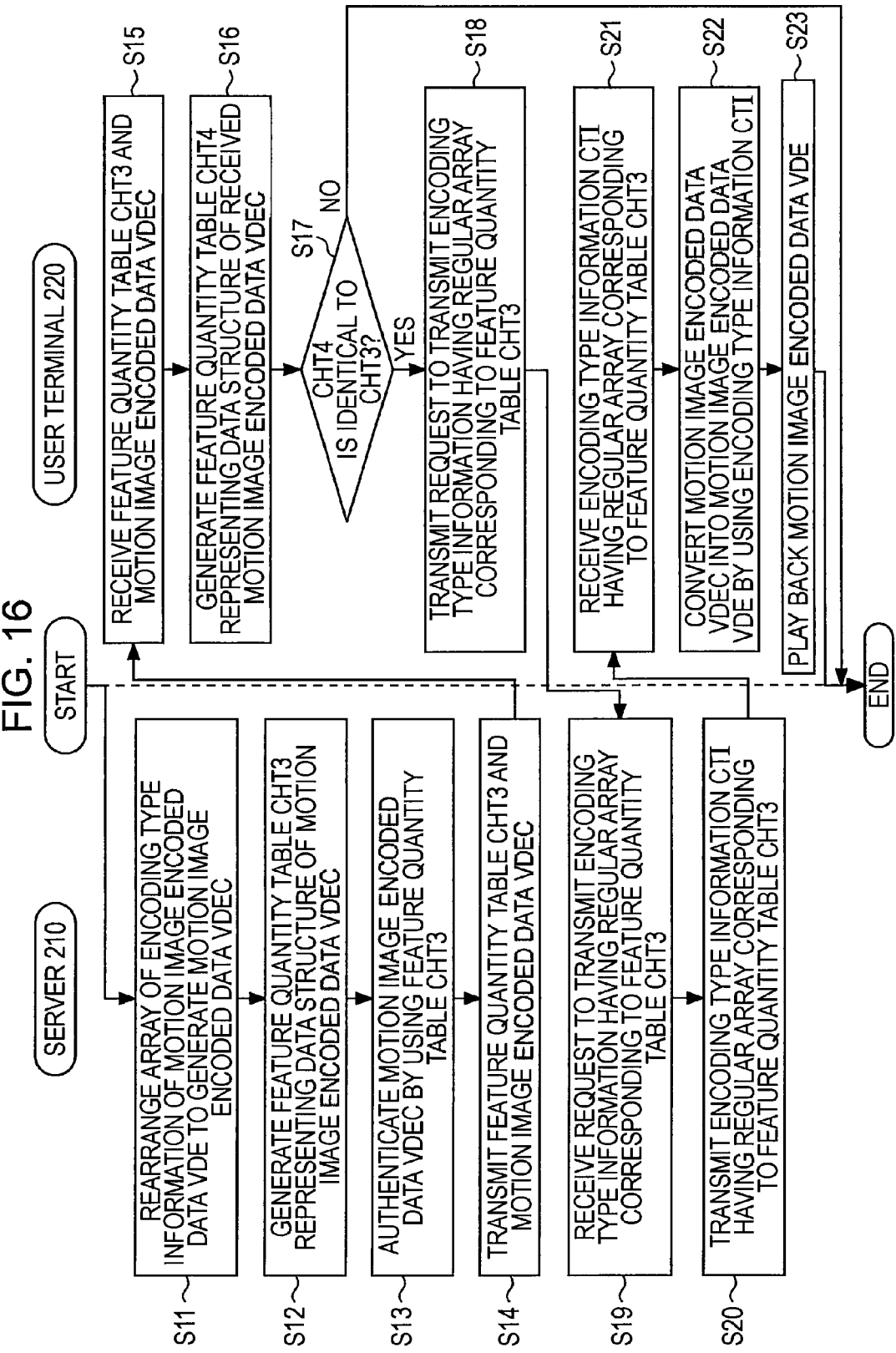
FIG. 16 is a flowchart illustrating the operation of the motion image distribution system shown in FIG. 9.

FIG. 16 is a flowchart illustrating the operation of the motion image distribution system 200 shown in FIG. 9.

Referring to FIG. 16, if a sequence of operations start, the information generation unit 211 of the server 210 receives motion image encoded data VDE from the outside, and rearranges the array of encoding type information in the data structure of received motion image encoded data VDE to generate motion image encoded data VDEC (Step S11).

The information generation unit 211 generates the feature quantity table CHT3 (the feature quantity table CHTT-A) representing the data structure of motion image encoded data VDEC on the basis of generated motion image encoded data VDEC in the above-described manner (Step S12).

The information generation unit 211 extracts the encoding type information CTI of motion image encoded data VDE and the encoding type information CTIC of motion image encoded data VDEC.

Then, the information generation unit 211 of the server 210 outputs the generated feature quantity table CHT3 to the authentication unit 213 and the transmitting/receiving unit 214, and also registers the feature quantity table CHT3 and the encoding type information CTI and CTIC in the information registration unit 212 in association with each other.

The authentication unit 213 of the server 210 sequentially searches a plurality of feature quantity tables CHT3'-1 to CHT3'-$n$ registered in the information registration unit 212, and determines whether or not the feature quantity table CHT3 received from the information generation unit 211 is identical to one of the plurality of feature quantity tables CHT3'-1 to CHT3'-$n$. If the feature quantity table CHT3 is identical to one of the plurality of feature quantity tables CHT3'-1 to CHT3'-$n$, the authentication unit 213 generates the authentication signal VF1 and outputs the generated authentication signal VF1 to the transmitting/receiving unit

214. That is, the authentication unit 213 authenticates motion image encoded data VDEC by using the feature quantity table CHT3 (Step S13). In this case, the authentication unit 213 determines whether or not the playback time, the encoding structure information, the rearrangement encoding mode, and the bit rate in the feature quantity table CHT3 are identical to the playback time, the encoding structure information, the rearrangement encoding mode, and the bit rate in each of the feature quantity tables CHT3'-1 to CHT3'-$n$, respectively, to thereby determine whether or not the feature quantity table CHT3 is identical to one of the plurality of feature quantity tables CHT3'-1 to CHT3'-$n$.

The transmitting/receiving unit 214 of the server 210 receives motion image encoded data VDEC and the feature quantity table CHT3 from the information generation unit 211. If the authentication signal VF1 is received from the authentication unit 213, the transmitting/receiving unit 214 transmits the feature quantity table CHT3 and motion image encoded data VDEC to the user terminal 220 (Step S14).

The transmitting/receiving unit 221 of the user terminal 220 receives the feature quantity table CHT3 and motion image encoded data VDEC (Step S15). The transmitting/receiving unit 221 outputs received motion image encoded data VDEC to the information generation unit 222, and also outputs the received feature quantity table CHT3 to the authentication unit 223.

The information generation unit 222 of the user terminal 220 generates the feature quantity table CHT4 (the feature quantity table CHTT-A) representing the data structure of motion image encoded data VDEC on the basis of motion image encoded data VDEC received from the transmitting/receiving unit 221 in the above-described manner (Step S16), and outputs the generated feature quantity table CHT4 to the authentication unit 223.

Next, the authentication unit 223 of the user terminal 220 receives the feature quantity table CHT3 from the transmitting/receiving unit 221, and also receives the feature quantity table CHT4 from the information generation unit 222. The authentication unit 223 of the user terminal 220 determines whether or not the feature quantity table CHT4 is identical to the feature quantity table CHT3 (Step S17).

In Step S17, if it is determined that the feature quantity table CHT4 is identical to the feature quantity table CHT3, the authentication unit 223 of the user terminal 220 generates the authentication signal VF2 indicating that motion image encoded data VDEC received by the transmitting/receiving unit 221 is regular data, and outputs the generated authentication signal VF2 to the transmitting/receiving unit 221.

If the authentication signal VF2 is received from the authentication unit 223, the transmitting/receiving unit 221 of the user terminal 220 transmits a request to transmit the encoding type information CTI arranged in a regular array corresponding to the feature quantity table CHT3 to the server 210 (Step S18).

The transmitting/receiving unit 214 of the server 210 receives the request to transmit the encoding type information CTI from the user terminal 220 (Step S19), and outputs a request to output the encoding type information CTI arranged in a regular array corresponding to the feature quantity table CHT3 to the information registration unit 212.

Then, the information registration unit 212 of the server 210 outputs the encoding type information CTI arranged in a regular array corresponding to the feature quantity table CHT3 to the transmitting/receiving unit 214 in response to the request to output the encoding type information CTI.

The transmitting/receiving unit 214 of the server 210 transmits the encoding type information CTI arranged in a regular array corresponding to the feature quantity table CHT3 to the user terminal 220 (Step S20). The transmitting/receiving unit 221 of the user terminal 220 receives the encoding type information CTI from the server 210 (Step S21).

If the encoding type information CTI is received, the transmitting/receiving unit 214 of the user terminal 220 outputs the received encoding type information CTI and motion image encoded data VDEC to the playback unit 224.

The playback unit 224 of the user terminal 220 receives the encoding type information CTI and motion image encoded data VDEC from the transmitting/receiving unit 221, returns the array of the encoding type information of motion image encoded data VDEC to a regular array by using the received encoding type information CTI, and converts motion image encoded data VDEC into motion image encoded data VDE (Step S22).

Then, the playback unit 224 of the user terminal 220 plays back motion image encoded data VDE (Step S23), and outputs motion image playback information to the outside.

In Step S17, if it is determined that the feature quantity table CHT4 is not identical to the feature quantity table CHT3, the authentication unit 223 of the user terminal 220 generates the non-authentication signal NVF2 indicating that motion image encoded data VDEC is not regular data, and outputs the generated non-authentication signal NVF2 to the transmitting/receiving unit 221. If the non-authentication signal NVF2 is received, the transmitting/receiving unit 221 does not transmit the request to transmit the encoding type information arranged in a regular array to the server 210. Therefore, in Step S17, if the feature quantity table CHT4 is not identical to the feature quantity table CHT3, motion image encoded data VDE is not played back, and a sequence of operations is ended.

As described above, the server 210 rearranges the encoding type information of input motion image encoded data VDE to generate motion image encoded data VDEC, authenticates motion image encoded data VDEC, and transmits the feature quantity table CHT3 and motion image encoded data VDEC to the user terminal 220. The user terminal 220 receives the feature quantity table CHT3 and motion image encoded data VDEC. If motion image encoded data VDEC is authenticated as regular data by using the received feature quantity table CHT3, the user terminal 220 transmits the request to transmit the encoding type information CTI arranged in a regular array to the server 210.

The server 210 transmits the encoding type information CTI arranged in a regular array to the user terminal 220. The user terminal 220 returns the encoding type information of motion image encoded data VDEC to a regular array by using the encoding type information CTI to generate motion image encoded data VDE, and plays back generated motion image encoded data VDE.

Therefore, according to this embodiment, it is possible to authenticate motion image encoded data VDEC on the basis of the data structure of motion image encoded data VDEC with no authentication data area.

The user terminal 220 plays back motion image encoded data VDE only when motion image encoded data can be authenticated as regular data. Therefore, only a regular user terminal having a mechanism for the above-described authentication processing can play back motion image encoded data VDE. As a result, motion image encoded data VDE can be distributed to only a regular user terminal.

Motion image encoded data to be transmitted to the user terminal 220 is not original motion image encoded data VDE, but it is motion image encoded data VDEC having rearranged encoding type information. Therefore, a user terminal having no mechanism for the above-described authentication processing and playback processing can receive motion image encoded data VDEC, but cannot play back motion image encoded data VDE since it cannot convert motion image encoded data VDEC into motion image encoded data VDE.

Therefore, the motion image distribution system 200 of the second embodiment can further suppress illegal distribution of motion image encoded data VDE, as compared with the motion image distribution system 100 of the first embodiment.

In the second embodiment, the server 210 may encrypt the feature quantity table CHT3 and motion image encoded data VDEC, and may simultaneously or separately the encrypted feature quantity table CHT3 and motion image encoded data VDEC to the user terminal 220.

The server 210 may encrypt the encoding type information CTI arranged in a regular array, and may transmit the encrypted encoding type information CTI to the user terminal 220.

In this case, the user terminal 220 transmits its unique ID to the server 210. If the server 210 determines that the user terminal 220 is a regular user terminal, the user terminal 220 receives an encryption key from the server 210, and decrypts the encrypted feature quantity table CHT3, motion image encoded data VDEC, and encoding type information CTI by using the received encryption key.

In the second embodiment, the feature quantity table CHT3 constitutes "first structure information" or "third structure information", and the feature quantity table CHT4 constitutes "second structure information" or "fourth structure information".

In the second embodiment, the information registration unit 212 constitutes a "database".

In the second embodiment, motion image encoded data VDEC constitutes "rearranged motion image encoded data."

Third Embodiment

FIG. 17 is a schematic block diagram of a motion image distribution system according to a third embodiment. Referring to FIG. 17, a motion image distribution system 300 according to a third embodiment includes a server 310 and a user terminal 320.

The server 310 includes an information generation unit 311, an information registration unit 312, an authentication unit 313, and a transmitting/receiving unit 314. The user terminal 320 includes a transmitting/receiving unit 321, an information generation unit 322, an authentication unit 323, a synthesis unit 324, and a playback unit 325.

If motion image encoded data VDE is received from the outside, the information generation unit 311 of the server 310 drops part of the data structure of motion image encoded data VDE to separate motion image encoded data VDE into contents data CTD and missing data LKD. In this case, missing data LKD includes data necessary for playback of motion image encoded data VDE. Contents data CTD is meaningless data which is meaningless even if it is played back.

The information generation unit 311 generates a feature quantity table CHT5 representing a data structure of contents data CTD and a feature quantity table CHT6 representing a data structure of missing data LKD.

The information generation unit 311 also generates separation information SEPA indicating which portion of motion image encoded data VDE corresponds to missing data LKD.

Then, the information generation unit 311 registers the feature quantity tables CHT5 and CHT6 and the separation information SEPA in the information registration unit 312 in association with each other. The information generation unit 311 outputs the feature quantity tables CHT5 and CHT6 to the authentication unit 313, and also outputs contents data CTD, missing data LKD, and the feature quantity tables CHT5 and CHT6 to the transmitting/receiving unit 314.

The information registration unit 312 receives the feature quantity tables CHT5 and CHT6 and the separation information SEPA from the information generation unit 311, and stores the received feature quantity tables CHT5 and CHT6 and separation information SEPA in association with each other.

The information registration unit 312 sequentially outputs a plurality of feature quantity tables CHT5' and CHT6' to the authentication unit 313 in response to a request to output a feature quantity table from the authentication unit 313. The feature quantity tables CHT5' and CHT6' are the same as the feature quantity tables CHT5 and CHT6, respectively. Here, in order to distinguish the feature quantity table transmitted from the information generation unit 311 to the authentication unit 313 from the feature quantity tables transmitted from the information registration unit 312 to the authentication unit 313, the feature quantity tables received from the information registration unit 312 are referred to as the "feature quantity tables CHT5' and CHT6'".

The information registration unit 312 receives a request to output the separation information SEPA associated with the feature quantity tables CHT5' and CHT6' from the transmitting/receiving unit 314, and outputs the separation information SEPA associated with the feature quantity tables CHT5' and CHT6' to the transmitting/receiving unit 314 in response to the received request.

The authentication unit 313 receives the feature quantity tables CHT5 and CHT6 from the information generation unit 311, and also receives a plurality of feature quantity tables CHT5' and CHT6' from the information registration unit 312. The authentication unit 313 sequentially searches the feature quantity tables CHT5' and CHT6' and determines whether or not the feature quantity tables CHT5 and CHT6 are identical to any feature quantity tables CHT5' and CHT6', respectively. In this case, the authentication unit 313 sequentially searches a plurality of feature quantity tables CHT5' and CHT6' and determines whether or not the feature quantity table CHT5 is identical to the feature quantity table CHT5', and the feature quantity table CHT6 is identical to the feature quantity table CHT6'. The authentication unit 313 determines whether or not the playback time, the encoding structure information, the encoding mode, and the bit rate in the feature quantity table CHT5 are identical to the playback time, the encoding structure information, the encoding mode, and the bit rate in the feature quantity table CHT5', thereby determining whether or not the feature quantity table CHT5 is identical to the feature quantity table CHT5'. Similarly, the authentication unit 313 determines whether or not the feature quantity table CHT6 is identical to the feature quantity table CHT6'.

When the feature quantity tables CHT5 and CHT6 are identical to any feature quantity tables CHT5' and CHT6' from among a plurality of feature quantity tables CHT5' and CHT6', respectively, the authentication unit 313 authenticates contents data CTD and missing data LKD as regular data. In this case, the authentication unit 313 generates the authentication signal VF1 indicating that contents data CTD and missing data LKD are regular data, and outputs the generated authentication signal VF1 to the transmitting/receiving unit 314.

When the feature quantity tables CHT5 and CHT6 are not identical to any feature quantity tables CHT5' and CHT6' of a plurality of feature quantity tables CHT5' and CHT6', respectively, the authentication unit 313 generates the non-authentication signal NVF1 indicating that contents data CTD and missing data LKD cannot be authenticated as regular data, and outputs the generated non-authentication signal NVF1 to the transmitting/receiving unit 314.

The transmitting/receiving unit 314 receives contents data CTD, missing data LKD, and the feature quantity tables CHT5 and CHT6 from the information generation unit 311, and also receives the authentication signal VF1 or the non-authentication signal NVF1 from the authentication unit 313.

If the authentication signal VF1 is received from the authentication unit 313, the transmitting/receiving unit 314 transmits contents data CTD, missing data LKD, and the feature quantity tables CHT5 and CHT6 to the user terminal 320. In this case, the transmitting/receiving unit 314 may simultaneously or separately transmit contents data CTD, missing data LKD, and the feature quantity tables CHT5 and CHT6 to the user terminal 320.

If a request to transmit the separation information SEPA is received from the user terminal 320, the transmitting/receiving unit 314 outputs a request to output the separation information SEPA to the information registration unit 312. If the separation information SEPA is received from the information registration unit 312, the transmitting/receiving unit 314 transmits the received separation information SEPA to the user terminal 320.

The transmitting/receiving unit 321 of the user terminal 320 receives contents data CTD, missing data LKD, and the feature quantity tables CHT5 and CHT6 from the server 310. The transmitting/receiving unit 321 outputs received contents data CTD and missing data LKD to the information generation unit 322, and also outputs the feature quantity tables CHT5 and CHT6 to the authentication unit 323.

The transmitting/receiving unit 321 receives the authentication signal VF2 or the non-authentication signal NVF2 from the authentication unit 313. If the authentication signal VF2 is received, the transmitting/receiving unit 321 transmits the request to transmit the separation information SEPA to the server 310. If the non-authentication signal NVF2 is received, the transmitting/receiving unit 321 does not transmit the request to transmit the separation information SEPA to the server 310.

If the separation information SEPA is received from the server 310, the transmitting/receiving unit 321 outputs contents data CTD, missing data LKD, and the separation information SEPA to the synthesis unit 324.

The information generation unit 322 receives contents data CTD and missing data LKD from the transmitting/receiving unit 321, and generates a feature quantity table CHT7 representing the data structure of contents data CTD and a feature quantity table CHT8 representing the data structure of missing data LKD. The information generation unit 322 outputs the generated feature quantity tables CHT7 and CHT8 to the authentication unit 323.

The authentication unit 323 receives the feature quantity tables CHT5 and CHT6 from the transmitting/receiving unit 321, and also receives the feature quantity tables CHT7 and CHT8 from the information generation unit 322. The authentication unit 323 determines whether or not the feature quantity table CHT7 is identical to the feature quantity table CHT5 and whether or not the feature quantity table CHT8 is identical to the feature quantity table CHT6.

When it is determined that the feature quantity table CHT7 is identical to the feature quantity table CHT5, and the feature quantity table CHT8 is identical to the feature quantity table CHT6, the authentication unit 323 authenticates contents data CTD and missing data LKD as regular data. In this case, the authentication unit 323 generates the authentication signal VF2 indicating that contents data CTD and missing data LKD are authenticated as regular data, and outputs the generated authentication signal VF2 to the transmitting/receiving unit 321.

When it is determined that the feature quantity table CHT7 is not identical to the feature quantity table CHT5 or the feature quantity table CHT8 is not identical to the feature quantity table CHT6, the authentication unit 323 generates the non-authentication signal NVF2 indicating that contents data CTD and missing data LKD cannot be authenticated as regular data, and outputs the generated non-authentication signal NVF2 to the transmitting/receiving unit 321. In the same manner as the authentication unit 313, the authentication unit 323 determines whether or not the feature quantity table CHT7 is identical to the feature quantity table CHT5 and the feature quantity table CHT8 is identical to the feature quantity table CHT6.

The synthesis unit 324 receives contents data CTD, missing data LKD, and the separation information SEPA from the transmitting/receiving unit 321. The synthesis unit 324 synthesizes contents data CTD and missing data LKD on the basis of the received separation information SEPA to generate motion image encoded data VDE, and outputs generated motion image encoded data VDE to the playback unit 325.

The playback unit 325 receives motion image encoded data VDE from the synthesis unit 324, and plays back received motion image encoded data VDE. The playback unit 325 also outputs motion image playback information to the outside.

In the third embodiment, the feature quantity tables include a feature quantity table CHT-CTD of contents data CTD and a feature quantity table CHT-LKD of missing data LKD. Each of the feature quantity tables CHT-CTD and CHT-LKD has the same structure of the feature quantity table CHT in the first embodiment.

FIG. 18 is a diagram showing a specific example of the feature quantity table CHT-CTD of contents data CTD. FIG. 19 is a diagram showing a specific example of the feature quantity table of motion image encoded data VDE.

Referring to FIGS. 18 and 19, the playback time, the encoding structure information, and the bit rate in a feature quantity table CHT-CTD-A are the same as the playback time, the encoding structure information, and the bit rate in the feature quantity table CHT-A (see FIG. 19).

The encoding mode of the feature quantity table CHT-CTD-A includes encoding type information obtained by partially dropping the encoding type information in the encoding mode of the feature quantity table CHT-A (see FIG. 19). Specifically, in the encoding mode of the feature quantity table CHT-CTD-A, $M_1M_1 \ldots M_2M_3$ includes encoding type information obtained by partially dropping the encoding type information $(M_2M_4M_3)$ in $M_1M_1 \ldots M_2M_4M_3 \ldots M_2M_3$ of the feature quantity table CHT-A (see FIG. 19). In the encoding mode of the feature quantity table CHT-CTD-A, $M_3M_4M_3 \ldots M_1 \ldots M_NM_2$ includes encoding type information obtained by causing partial encoding type information $(M_2M_3)$ in $M_3M_4M_3 \ldots M_2M_1M_3 \ldots M_NM_2$ of the feature quantity table CHT-A (see FIG. 19). Similarly, in the encoding mode of the feature quantity table CHT-CTD-A, $M_3M_4M_3 \ldots M_2M_1$ includes encoding type information obtained by causing partial encoding type information $(M_1M_2)$ in $M_3M_4M_3 \ldots M_1M_2 \ldots M_2M_1$ of the feature quantity table CHT-A (see FIG. 19).

As another specific example of the feature quantity table CHT-CTD, a feature quantity table may be used in which actual data including the motion vectors $MV_1$ to $MV_G$ or the quantization coefficient information $Q_1$ to $Q_G$ is further included, in addition to the items of the feature quantity table CHT-CTD-A.

As another specific example of the feature quantity table CHT-CTD, a feature quantity table may be used in which the encoding structure information, the encoding mode, and the bit rate in the feature quantity table CHT-CTD-A are hierarchized, like the feature quantity table CHT-C (see FIG. 7).

FIG. 20 is a diagram showing a specific example of the feature quantity table CHT-LKD of missing data LKD. Referring to FIG. 20, the playback time, the encoding structure information, and the bit rate in the feature quantity table CHT-LKD-A are the same as the playback time, the encoding structure information, and the bit rate in the feature quantity table CHT-A (see FIG. 19), respectively.

The encoding mode of the feature quantity table CHT-LKD-A includes partial encoding type information dropped from the encoding mode of the feature quantity table CHT-A (see FIG. 19). Specifically, in the encoding mode of the feature quantity table CHT-LKD-A, $M_2M_4M_3$ is partial encoding type information ($M_2M_4M_3$) dropped from $M_1M_1 \ldots M_2M_4M_3 \ldots M_2M_3$ of the feature quantity table CHT-A (see FIG. 19). In the encoding mode of the feature quantity table CHT-LKD-A, $M_2M_3$ is partial encoding type information ($M_2M_3$) dropped from $M_3M_4M_3 \ldots M_2M_1M_3 \ldots M_NM_2$ of the feature quantity table CHT-A (see FIG. 19). Similarly, in the encoding mode of the feature quantity table CHT-LKD-A, $M_1M_2$ is partial encoding type information ($M_1M_2$) dropped from $M_3M_4M_3 \ldots M_1M_2 \ldots M_2M_1$ of the feature quantity table CHT-A (see FIG. 19).

As another specific example of the feature quantity table CHT-LKD, a feature quantity table may be used in which actual data including the motion vectors $MV_1$ to $MV_G$ or the quantization coefficient information $Q_1$ to $Q_G$ is further included, in addition to the items of the feature quantity table CHT-LKD-A.

As another specific example of the feature quantity table CHT-LKD, a feature quantity table may be used in which the encoding structure information, the encoding mode, and the bit rate in the feature quantity table CHT-LKD-A are hierarchized, like the feature quantity table CHT-C (see FIG. 7).

FIG. 21 is a diagram showing a specific example of the separation information SEPA. Referring to FIG. 21, separation information SEPA-A includes separation data, and separation data includes an array of "0" or "1". "0" represents that no data is missing, and "1" represents that data is missing.

"0" in the first row corresponds to the sequence, and "0" in the second row corresponds to $GOP_1$. "0" in the third row corresponds to $Picture_1 \ldots Picture_P$ of $GOP_1$, "000 ... 1 ... 00" in the fourth row corresponds to $Slice_1 \ldots Slice_Y$ of $GOP_1$, and "00 ... 111 ... 00" in the fifth row corresponds to $MB_1 \ldots MB_X$ of $GOP_1$. The same is applied to the sixth row and later.

As a result, "000 ... 1 ... 00" in the fourth row represents the positions of missing data in $Slice_1 \ldots Slice_Y$ of $GOP_1$, and "00 ... 111 ... 00" in the fifth row represents the positions of missing data in $MB_1 \ldots MB_X$ of $GOP_1$. The same is applied to the sixth row and later.

Therefore, the position of single missing data in $Slice_1 \ldots Slice_Y$ of $GOP_1$ and the positions of three of missing data in $MB_1 \ldots MB_X$ of $GOP_1$ can be detected from the separation information SEPA. Similarly, the positions of missing data in $GOP_2$ to $GOP_G$ can be detected.

The information generation unit 311 of the server 310 decides data to be dropped on the basis of motion image encoded data VDE, confirms the position of decided data, and generates the separation information SEPA.

The information generation unit 311 drops decided data from motion image encoded data VDE to generate contents data CTD and missing data LKD.

In this case, the information generation unit 311 drops partial data from motion image encoded data VDE in accordance with what ratio data is missing or whether or not encoding type information of motion image encoded data representing a center position of a screen or a motion area as being visually important is missing.

Figure 22:
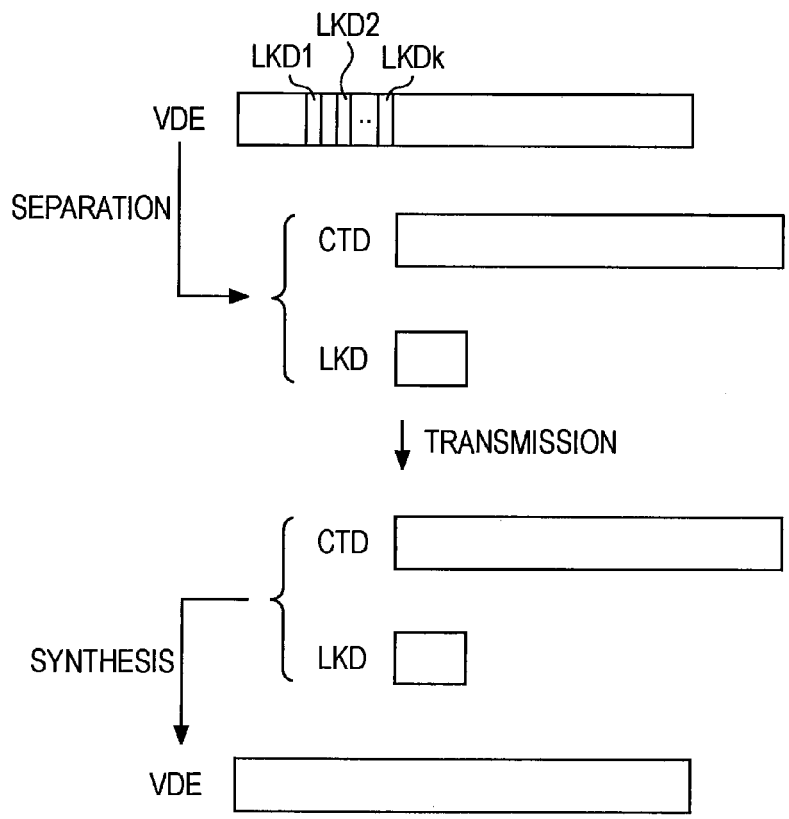
FIG. 22 is a conceptual view of separation and synthesis of motion image encoded data in the motion image distribution system shown in FIG. 17.

FIG. 22 is a conceptual view of separation and synthesis of motion image encoded data VDE in the motion image distribution system 300 of FIG. 17.

Referring to FIG. 22, if motion image encoded data VDE is received, the server 310 decides data LKD1 to LKDk to be dropped on the basis of motion image encoded data VDE, and drops decided data LKD1 to LKDk from motion image encoded data VDE to separate motion image encoded data VDE into contents data CTD and missing data LKD. Missing data LKD has an array in which data LKD1 to LKDk are sequentially arranged.

The server 310 transmits contents data CTD and missing data LKD to the user terminal 320.

The user terminal 320 receives contents data CTD and missing data LKD from the server 310, and synthesizes receives contents data CTD and missing data LKD by using the separation information SEPA (to be transmitted from the server 310) to generate motion image encoded data VDE.

Specifically, the synthesis unit 324 of the user terminal 320 can detect missing data of $Slice_1 \ldots Slice_Y$ and $MB_1 \ldots MB_X$ of $GOP_1$ with reference to the separation information SEPA-A. Therefore, the synthesis unit 324 sequentially extracts data LKD1 to LKDk from the head of missing data LKD, and returns extracted data LKD1 to LKDk to the detected positions of contents data CTD to synthesize contents data CTD and missing data LKD.

Figure 23:
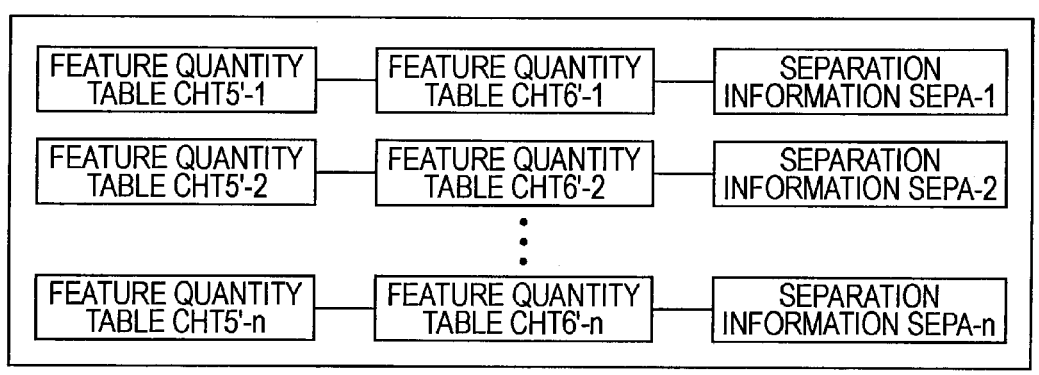
FIG. 23 is a diagram showing the correspondence relationship between contents data, missing data, and separation information.

FIG. 23 is a diagram showing the correspondence relationship between contents data CTD, missing data LKD, and separation information SEPA.

Referring to FIG. 23, the information registration unit 312 of the server 310 stores feature quantity tables CHT5'-1 to CHT5'-*n*, feature quantity tables CHT6'-1 to CHT6'-*n*, and separation information SEPA-1 to SEPA-n.

The feature quantity table CHT5'-1, the feature quantity table CHT6'-1, and the separation information SEPA-1 are associated with each other, and the feature quantity table CHT5'-2, the feature quantity table CHT6'-2, and the separation information SEPA-2 are associated with each other. Similarly, the feature quantity table CHT5'-*n*, the feature quantity table CHT6'-*n*, and the separation information SEPA-n are associated with each other.

Therefore, if the feature quantity table CHT5, the feature quantity table CHT6, and the separation information SEPA are received from the information generation unit 311, the information registration unit 312 stores the received feature quantity table CHT5, feature quantity table CHT6, and separation information SEPA in association with each other.

If a request to output a feature quantity table is received from the authentication unit 313, the information registration unit 312 sequentially outputs the feature quantity tables CHT5'-1 and CHT6'-1, the feature quantity tables CHT5'-2 and CHT6'-2, ..., and the feature quantity table CHT5'-*n* and CHT6'-*n* to the authentication unit 313.

If a request to output the separation information SEPA-i corresponding to the feature quantity tables CHT5'-*i* and CHT6'-*i* is received from the transmitting/receiving unit 314, the information registration unit 312 outputs the separation information SEPA-i associated with the feature quantity tables CHT5'-$i$ and CHT6'-$i$ to the transmitting/receiving unit 314.

FIG. 24 is a flowchart illustrating the operation of the motion image distribution system 300 shown in FIG. 17.

Referring to FIG. 24, if a sequence of operations start, the information generation unit 311 of the server 310 receives motion image encoded data VDE from the outside. The information generation unit 311 drops part of the data structure of received motion image encoded data VDE to separate motion image encoded data VDE into contents data CTD and missing data LKD, and generates the separation information SEPA (Step S31).

The information generation unit 311 generates the feature quantity table CHT5 (the feature quantity table CHT-CTD-A) representing the data structure of contents data CTD on the basis of contents data CTD by using the above-described manner, and also generates the feature quantity table CHT6 (the feature quantity table CHT-LKD-A) representing the data structure of missing data LKD on the basis of missing data LKD by using the above-described manner (Step S32).

Then, the information generation unit 311 of the server 310 registers the feature quantity tables CHT5 and CHT6 and the separation information SEPA in the information registration unit 312 in association with each other.

The information generation unit 311 outputs the feature quantity tables CHT5 and CHT6 to the authentication unit 313, and also outputs contents data CTD, missing data LKD, and the feature quantity tables CHT5 and CHT6 to the transmitting/receiving unit 314.

The authentication unit 313 of the server 310 sequentially searches a plurality of feature quantity tables CHT5'-1 and CHT6'-1 to CHT5'-$n$ and CHT6'-$n$ registered in the information registration unit 312, and determines whether or not the feature quantity tables CHT5 and CHT6 received from the information generation unit 311 are identical to any feature quantity tables of the plurality of feature quantity tables CHT5'-1 and CHT6'-1 to CHT5'-$n$ and CHT6'-$n$, respectively. If the feature quantity tables CHT5 and CHT6 are identical to any feature quantity tables CHT5'-$i$ and CHT6'-$i$ of the plurality of feature quantity tables CHT5'-1 and CHT6'-1 to CHT5'-$n$ to CHT6'-$n$, respectively, the authentication unit 313 determines that contents data CTD and missing data LKD are regular data, generates the authentication signal VF1, and outputs the generated authentication signal VF1 to the transmitting/receiving unit 314. That is, the authentication unit 313 authenticates contents data CTD and missing data LKD by using the feature quantity tables CHT5 and CHT6 (Step S33). In this case, in the same manner as the authentication unit 213, the authentication unit 313 determines whether or not the feature quantity tables CHT5 and CHT6 are identical to any feature quantity tables of the plurality of feature quantity tables CHT5'-1 and CHT6'-1 to CHT5'-$n$ and CHT6'-$n$, respectively.

The transmitting/receiving unit 314 of the server 310 receives contents data CTD, missing data LKD, and the feature quantity tables CHT5 and CHT6 from the information generation unit 311. If the authentication signal VF1 is received from the authentication unit 313, the transmitting/receiving unit 314 transmits contents data CTD, missing data LKD, and the feature quantity tables CHT5 and CHT6 to the user terminal 320 (Step S34).

The transmitting/receiving unit 321 of the user terminal 320 receives contents data CTD, missing data LKD, and the feature quantity tables CHT5 and CHT6 (Step S35). The transmitting/receiving unit 321 outputs received contents data CTD and missing data LKD to the information generation unit 322, and also outputs the received feature quantity tables CHT5 and CHT6 to the authentication unit 323.

The information generation unit 322 of the user terminal 320 generates the feature quantity table CHT7 (the feature quantity table CHT-CTD-A) representing the data structure of contents data CTD and the feature quantity table CHT8 (the feature quantity table CHT-LKD-A) representing the data structure of missing data LKD on the basis of contents data CTD and missing data LKD received from the transmitting/receiving unit 321 by using the above-described manner (Step S36). The information generation unit 322 outputs the generated feature quantity tables CHT7 and CHT8 to the authentication unit 323.

Next, the authentication unit 323 of the user terminal 320 receives the feature quantity tables CHT5 and CHT6 from the transmitting/receiving unit 321, and also receives the feature quantity tables CHT7 and CHT8 from the information generation unit 322. The authentication unit 323 of the user terminal 320 determines whether or not the feature quantity table CHT7 is identical to the feature quantity table CHT5, and the feature quantity table CHT8 is identical to the feature quantity table CHT6 (Step S37). In this case, in the same manner as the authentication unit 213, the authentication unit 323 determines whether or not the feature quantity tables CHT7 and CHT8 are identical to the feature quantity tables CHT5 and CHT6, respectively.

In Step S37, if it is determined that the feature quantity table CHT7 is identical to the feature quantity table CHT5, and the feature quantity table CHT8 is identical to the feature quantity table CHT6, the authentication unit 323 of the user terminal 320 authenticates contents data CTD and missing data LKD received by the transmitting/receiving unit 321 as regular data. In this case, the authentication unit 323 generates the authentication signal VF2 indicating that contents data CTD and missing data LKD are regular data, and outputs the generated authentication signal VF2 to the transmitting/receiving unit 321.

If the authentication signal VF2 is received from the authentication unit 313, the transmitting/receiving unit 321 of the user terminal 320 transmits a request to transmit the separation information SEPA corresponding to the feature quantity tables CHT5 and CHT6 to the server 310 (Step S38).

The transmitting/receiving unit 314 of the server 310 receives the request to transmit the separation information SEPA from the user terminal 320 (Step S39), and outputs a request to output the separation information SEPA corresponding to the feature quantity tables CHT5 and CHT6 to the information registration unit 312.

Then, the information registration unit 312 of the server 310 outputs the separation information SEPA associated with the feature quantity tables CHT5 and CHT6 to the transmitting/receiving unit 314 in response to the request to output the separation information SEPA.

The transmitting/receiving unit 314 of the server 310 transmits the separation information SEPA associated with the feature quantity tables CHT5 and CHT6 to the user terminal 320 (Step S40). The transmitting/receiving unit 321 of the user terminal 320 receives the separation information SEPA from the server 310 (Step S41).

If the separation information SEPA is received, the transmitting/receiving unit 314 of the user terminal 320 outputs the received separation information SEPA, contents data CTD, and missing data LKD to the synthesis unit 324.

The synthesis unit 324 of the user terminal 320 receives the separation information SEPA, contents data CTD, and missing data LKD from the transmitting/receiving unit 321, and synthesizes contents data CTD and missing data LKD by using the received separation information SEPA in the above-described manner, to thereby generate motion image encoded data VDE (Step S42).

Next, the synthesis unit 324 outputs motion image encoded data VDE to the playback unit 325. The playback unit 325 plays back motion image encoded data VDE received from the synthesis unit 324 (Step S43), and outputs motion image playback information to the outside.

In Step S37, if it is determined that the feature quantity table CHT7 is identical to the feature quantity table CHT5, but the feature quantity table CHT8 is not identical to the feature quantity table CHT6, the authentication unit 323 of the user terminal 320 outputs, to the transmitting/receiving unit 321, the non-authentication signal NVF2 indicating that contents data CTD and missing data LKD are not regular data. If the non-authentication signal NVF2 is received, the transmitting/receiving unit 321 does not transmit the request to transmit the separation information SEPA to the server 310. Therefore, in Step S37, when it is determined that the feature quantity table CHT7 is identical to the feature quantity table CHT5, but the feature quantity table CHT8 is not identical to the feature quantity table CHT6, contents data CTD and missing data LKD are not synthesized, and motion image encoded data VDE is not played back. Thus, a sequence of operations is ended.

As described above, the server 310 separates input motion image encoded data VDE into contents data CTD and missing data LKD, authenticates contents data CTD and missing data LKD, and transmits contents data CTD, missing data LKD, and the feature quantity tables CHT5 and CHT6 to the user terminal 320. The user terminal 320 receives contents data CTD, missing data LKD, and the feature quantity tables CHT5 and CHT6, and if contents data CTD and missing data LKD are authenticated as regular data by using the received feature quantity tables CHT5 and CHT6, transmits the request to transmit the separation information SEPA to the server 310.

The server 310 transmits the separation information SEPA to the user terminal 320. The user terminal 320 synthesizes contents data CTD and missing data LKD by using the separation information SEPA to generate motion image encoded data VDE, and plays back generated motion image encoded data VDE.

Therefore, according to this embodiment, it is possible to authenticate motion image encoded data VDE on the basis of the data structure of motion image encoded data VDE with no authentication data area.

The user terminal 320 can synthesize contents data CTD and missing data LKD to generate motion image encoded data VDE only when contents data CTD and missing data LKD can be authenticated as regular data. Therefore, only a regular user terminal having a mechanism for the above-described authentication processing and synthesis processing can play back motion image encoded data VDE. As a result, motion image encoded data VDE can be distributed to only a regular user terminal.

Contents data CTD to be transmitted to the user terminal 320 is not original motion image encoded data VDE, but it is data which is meaningless even if it is played back. Therefore, a user terminal having no mechanism for the above-described authentication processing and synthesis processing can receive contents data CTD and missing data LKD, but cannot synthesize contents data CTD and missing data LKD to generate motion image encoded data VDE.

Therefore, the motion image distribution system 300 of the third embodiment can further suppress illegal distribution of motion image encoded data VDE, as compared with the motion image distribution system 100 of the first embodiment.

In the third embodiment, the server 310 may encrypt contents data CTD, missing data LKD, and the feature quantity tables CHT5 and CHT6, and may simultaneously or separately encrypted contents data CTD, missing data LKD, and feature quantity tables CHT5 and CHT6 to the user terminal 320.

The server 310 may encrypt the separation information SEPA and may transmit the encrypted separation information SEPA to the user terminal 320.

In this case, the user terminal 320 transmits its unique ID to the server 310. If the server 310 determines that the user terminal 320 is a regular user terminal, the user terminal 320 receives an encryption key from the server 310, and decrypts encrypted contents data CTD, missing data LKD, feature quantity tables CHT5 and CHT6, and separation information SEPA by using the received encryption key.

In the third embodiment, the feature quantity tables CHT5 and CHT6 constitute "first structure information", and the feature quantity tables CHT7 and CHT8 constitute "second structure information".

In the third embodiment, the feature quantity table CHT6 constitutes "third structure information", and the feature quantity table CHT5 constitutes "fourth structure information". The feature quantity table CHT8 constitutes "fifth structure information", and the feature quantity table CHT7 constitutes "sixth structure information".

In the third embodiment, the separation information SEPA constitutes "missing information".

In the third embodiment, the information registration unit 312 constitutes a "database".

A motion image distribution system may be a motion image distribution system, which is a combination of the motion image distribution system 200 and the motion image distribution system 300.

In this case, in the feature quantity tables CHT5 and CHT7 of contents data CTD, the encoding mode includes rearranged encoding type information. In the feature quantity tables CHT6 and CHT8 of missing data LKD, the encoding mode includes rearranged encoding type information.

The server transmits rearranged contents data CTDC and missing data LKDC to the user terminal.

The server transmits two kinds of encoding type information CTI arranged in a regular array associated with contents data CTD and missing data LKD, respectively, and the separation information SEPA to the user terminal.

The user terminal receives rearranged contents data CTDC and missing data LKDC, and also receives the two kinds of encoding type information CTI and the separation information SEPA. The user terminal converts contents data CTDC and missing data LKDC into contents data CTD and missing data LKD arranged in a regular array by using the two kinds of encoding type information CTI. The user terminal synthesizes contents data CTD and missing data LKD by using the separation information SEPA to generate motion image encoded data VDE, and plays back motion image encoded data VDE.

Therefore, it is possible to promote legal distribution of motion image encoded data VDE.

It should be understood that the foregoing embodiments are not limitative, but illustrative in all aspects. The scope is defined by the appended claims rather than by the description preceding them, and all changes and modifications that fall within metes and bounds of claims, or equivalents of such metes and bounds are therefore intended to be embraced by the claims.

Representative embodiments are applied to a motion image distribution system that can authenticate data with no authentication data area. Representative embodiments are also applied to a motion image distribution method that can authenticate data with no authentication data area. Representative embodiments are also applied to a server for a motion image distribution system that can authenticate data with no authentication data area. Representative embodiments are also applied to a user terminal for a motion image distribution system that can authenticate data with no authentication data area.

What is claimed is:

1. A motion image distribution system comprising:
a server configured to:
receive motion image encoded data obtained by encoding motion image data;
generate a first data structure representing structure information of the motion image encoded data on the basis of the motion image encoded data, the first data structure comprising three or more different types of data, including bit rate information, associated with the motion image encoded data;
determine, responsive to searching a plurality of data structures stored on the server, that the first data structure is a match to at least one of the plurality of data structures that comprises the three or more different types of data, including the bit rate information, wherein the three or more different types of data, in the first data structure matches the three or more different types of data in the at least one of the plurality of data structures;
authenticate the motion image encoded data as regular data using the first data structure; and
transmit the first structure information and the motion image encoded data; and a user terminal configured to:
receive the first structure information and the motion image encoded data from the server;
generate a second data structure representing the structure information of the motion image encoded data on the basis of received motion image encoded data;
determine that the generated second data structure is identical to the received first data structure;
authenticate the motion image encoded data as regular data; and
play back the motion image encoded data;
wherein the server comprises a database including a collection of structure information representing various kinds of motion image encoded data as regular data.

2. The motion image distribution system of claim 1, wherein the three or more different types of data includes at least one of a playback time associated with the motion image encoded data, encoding structure information associated with the motion image encoded data, an encoding mode associated with the motion image encoded data, motion vector information of the motion image encoded data, and quantization coefficient information of the motion image encoded data.

3. The motion image distribution system of claim 2, wherein the bit rate and the at least one of the playback time, the encoding structure information, the encoding mode, motion vector information of the motion image encoded data, and quantization coefficient information of the motion image encoded data are represented in a feature quantity table.

4. The motion image distribution system of claim 1, wherein the first data structure includes temporal information associated with the motion image encoded data and hierarchical information representing a hierarchy of the motion image encoded data.

5. The motion image distribution system of claim 4, wherein the hierarchy of the motion image encoded data includes a plurality of layers, the plurality of layers comprising at least one of a data layer, a contents layer, a sequence layer, a group of picture layer, a picture layer, a slice layer, a macro block layer, and a block layer.

6. The motion image distribution system of claim 1, wherein the server is configured to generate the first data structure based on at least one motion vector associated with the motion image encoded data.

7. The motion image distribution system of claim 1, wherein the server is configured to encrypt the first data structure and to provide an encryption key to the user terminal, and wherein the user terminal is configured to decrypt the first data structure using the encryption key.

8. A server comprising:
an information generation unit configured to:
receive motion image encoded data obtained by encoding motion image data; and
generate a data structure representing structure information of the motion image encoded data on the basis of the motion image encoded data, the data structure comprising three or more different types of data, including bit rate information, associated with the motion image encoded data;
a database configured to store a plurality of data structures representing various kinds of motion image encoded data as regular data;
an authentication unit configured to:
determine, responsive to searching the plurality of data structures, that the data structure received from the information generation unit is a match to at least one of the plurality of data structures that comprises the three or more different types of data, including the bit rate information, wherein the three or more different types of data in the data structure information matches the three or more different types of data in the at least one of the plurality of data structures; and
authenticate the motion image encoded data as regular data when data structure received from the information generation unit is identical to one of the plurality of data structures stored in the database; and
a transmitting unit configured to, responsive to the authentication unit authenticating the motion image encoded data as regular data, transmit the data structure received from the information generation unit and the motion image encoded data to a user terminal.

9. The server of claim 8, wherein the three or more different types of data includes at least one of a playback time associated with the motion image encoded data, encoding structure information associated with the motion image encoded data, an encoding mode associated with the motion image encoded data, motion vector information of the motion image encoded data, and quantization coefficient information of the motion image encoded data.

10. The server of claim 8, wherein the data structure includes temporal information associated with the motion image encoded data and hierarchical information representing a hierarchy of the motion image encoded data.

11. The server of claim 10, wherein the hierarchy of the motion image encoded data includes a plurality of layers, the plurality of layers comprising at least one of a data layer, a contents layer, a sequence layer, a group of picture layer, a picture layer, a slice layer, a macro block layer, and a block layer.

12. The server of claim 8, wherein the server is configured to generate the data structure based on at least one motion vector associated with the motion image encoded data.

13. The server of claim 8, wherein the server is configured to encrypt the data structure and to provide an encryption key to the user terminal for decrypting the data structure.

14. A user terminal comprising:
a receiving unit configured to:
receive a first data structure representing structure information of rearranged motion image encoded data obtained by rearranging a plurality of encoding type information representing encoding type information of motion image encoded data obtained by encoding motion image data, and the rearranged motion image encoded data from a server; and
receive encoding information obtained by rearranging the plurality of encoding type information in a regular array from the server;
an information generation unit configured to generate a second data structure representing the structure information of the rearranged motion image encoded data on the basis of the rearranged motion image encoded data received by the receiving unit;
an authentication unit configured to:
determine the first data structure received from the information generation unit is a match to at least one of a plurality of data structures that comprises the three or more different types of data, including the bit rate information, wherein the three or more different types of data in the first data structure matches the three or more different types of data in the at least one of the plurality of data structures; and
authenticate the motion image encoded data as regular data; and
a playback unit configured to;
responsive to authenticating the motion image encoded data as regular data, rearrange the plurality of encoding type information of the rearranged motion image encoded data in a regular array by using the encoding information to generate the motion image encoded data; and
play back the motion image encoded data,
wherein the data structure comprises bit rate information associated with the rearranged motion image encoded data.

15. The user terminal of claim 14, wherein the three or more different types of data includes at least one of a playback time associated with the motion image encoded data, encoding structure information associated with the motion image encoded data, and an encoding mode associated with the motion image encoded data, motion vector information of the motion image encoded data, and quantization coefficient information of the motion image encoded data.

16. The user terminal of claim 14, wherein the first data structure includes temporal information associated with the motion image encoded data and hierarchical information representing a hierarchy of the motion image encoded data.

17. The user terminal of claim 14, wherein the hierarchy of the motion image encoded data includes a plurality of layers, the plurality of layers comprising at least one of a data layer, a contents layer, a sequence layer, a group of picture layer, a picture layer, a slice layer, a macro block layer, and a block layer.

18. The user terminal of claim 14, wherein the server is configured to generate the first data structure based on at least one motion vector associated with the motion image encoded data.

19. The user terminal of claim 14, wherein the first data structure is encrypted and the receiving unit is further configured to receive an encryption key from the server for decrypting the first data structure.

20. The user terminal of claim 19, wherein the user terminal is configured to transmit a unique identification to the server so as to trigger transmission of the encryption key.

* * * * *

UNITED STATES PATENT AND TRADEMARK OFFICE
CERTIFICATE OF CORRECTION

PATENT NO. : 9,215,495 B2
APPLICATION NO. : 13/153002
DATED : December 15, 2015
INVENTOR(S) : Kodama It is certified that error appears in the above-identified patent and that said Letters Patent is hereby corrected as shown below:

In the specification,

In Column 1, Line 8, delete "§120" and insert -- § 120 --, therefor.

In the claims,

In Column 31, Line 32, in Claim 1, delete "data," and insert -- data --, therefor.

Signed and Sealed this
Fourteenth Day of June, 2016

Michelle K. Lee
*Director of the United States Patent and Trademark Office*